(12) United States Patent
Teraoka et al.

(10) Patent No.: US 8,038,070 B2
(45) Date of Patent: Oct. 18, 2011

(54) NONCONTACT DATA CARRIER

(75) Inventors: Koji Teraoka, Osaka (JP); Atsuo Inoue, Kyoto (JP)

(73) Assignee: Panasonic Corporation, Osaka (JP)

( * ) Notice: Subject to any disclaimer, the term of this patent is extended or adjusted under 35 U.S.C. 154(b) by 846 days.

(21) Appl. No.: 12/090,762

(22) PCT Filed: Sep. 28, 2006

(86) PCT No.: PCT/JP2006/319385
§ 371 (c)(1),
(2), (4) Date: Apr. 18, 2008

(87) PCT Pub. No.: WO2007/046224
PCT Pub. Date: Apr. 26, 2007

(65) Prior Publication Data
US 2010/0176202 A1   Jul. 15, 2010

(30) Foreign Application Priority Data
Oct. 18, 2005  (JP) .................... 2005-303754

(51) Int. Cl.
*G06K 19/06*   (2006.01)
*G06K 7/08*    (2006.01)
(52) U.S. Cl. ........ 235/492; 235/375; 235/380; 235/451; 340/572.1
(58) Field of Classification Search .......... 235/375, 235/380, 451, 487, 492; 340/572.1
See application file for complete search history.

(56) References Cited

U.S. PATENT DOCUMENTS

| | | | |
|---|---|---|---|
| 5,103,222 A | | 4/1992 | Hogen Esch et al. |
| 6,079,619 A | * | 6/2000 | Teraura et al. ............ 235/380 |
| 6,489,883 B1 | | 12/2002 | Iiyama et al. |
| 6,952,167 B2 | * | 10/2005 | Wakabayashi ........... 340/572.5 |
| 7,003,650 B2 | * | 2/2006 | Babaian et al. ............ 712/218 |

(Continued)

FOREIGN PATENT DOCUMENTS
JP   63-227140   9/1988
(Continued)

OTHER PUBLICATIONS

International Search Report issued Nov. 28, 2006 in International (PCT) Application No. PCT/JP2006/319385.

(Continued)

*Primary Examiner* — Thien M. Le
*Assistant Examiner* — Tuyen K Vo
(74) *Attorney, Agent, or Firm* — Wenderoth, Lind & Ponack, L.L.P.

(57) ABSTRACT

When performing radio communication with a reader/writer (1), supply of a power source S4 from a battery (14) is started when a level judgment circuit (9) judges that the signal level of a reception signal S2 received by an antenna (5) of a noncontact data carrier (4) is equal to or higher than a predetermined amplitude and a timer circuit (10) judges that the state where the amplitude is equal to or higher than the predetermined value has continued for a predetermined period $T_1$ or more, and further, the supply of the power source S4 from the battery is stopped when the level judgment circuit (9) judges that the signal level of the reception signal S2 is lower than the predetermined amplitude and the timer circuit (10) judges that state where the amplitude is lower than the predetermined value has continued for a predetermined period $T_2$ or more, thereby ensuring communication reliability that causes no problem in practical use of the noncontact data carrier (4), and avoiding insignificant dissipation of the battery.

6 Claims, 19 Drawing Sheets

U.S. PATENT DOCUMENTS

| | | |
|---|---|---|
| 2005/0173542 A1* | 8/2005 | Watanabe et al. ............. 235/492 |
| 2005/0284940 A1 | 12/2005 | Enomoto et al. |
| 2006/0202043 A1* | 9/2006 | Watanabe et al. ............. 235/492 |

FOREIGN PATENT DOCUMENTS

| | | |
|---|---|---|
| JP | 64-80892 | 3/1989 |
| JP | 4-358959 | 12/1992 |
| JP | 8-167014 | 6/1996 |
| JP | 9-134239 | 5/1997 |
| JP | 10-76948 | 3/1998 |
| JP | 10-302028 | 11/1998 |
| JP | 11-25237 | 1/1999 |
| JP | 11-338984 | 12/1999 |
| JP | 11-345292 | 12/1999 |
| JP | 2000-90220 | 3/2000 |
| JP | 2003-6590 | 1/2003 |
| JP | 2004-64328 | 2/2004 |
| JP | 2005-80205 | 3/2005 |
| JP | 2005-148795 | 6/2005 |
| JP | 2005-208754 | 8/2005 |

OTHER PUBLICATIONS

Written Opinion of the ISA issued Nov. 28, 2006 in International (PCT) Application No. PCT/JP2006/319385.

* cited by examiner

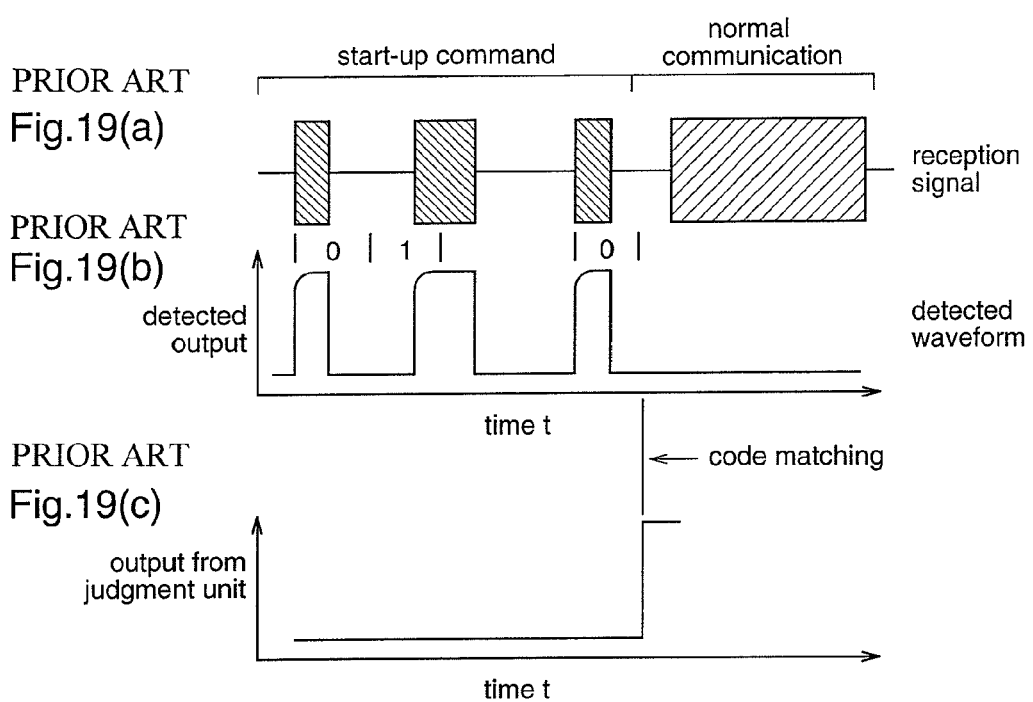

NONCONTACT DATA CARRIER

TECHNICAL FIELD

The present invention relates to noncontact data carriers such as a noncontact IC card and a noncontact tag, and more particularly, to a noncontact data carrier having a battery.

BACKGROUND ART

Battery-less noncontact data carriers include a noncontact IC card which performs proximity communication by electromagnetically-induced binding using a frequency in an HF (High Frequency) band, and a noncontact tag which performs a longer-distance communication relative to the proximity communication, using an electromagnetic wave of a frequency in a UHF (Ultra High Frequency) band or a SHF (Super High Frequency) band. Many of these noncontact data carriers are operated with a power source that is obtained from a signal received by radio communication from a reader/writer.

However, there is a current situation where the noncontact tag is restricted in reception power which is obtained from the reader/writer as compared with the noncontact IC card performing proximity communication, and it is difficult to enhance the performance or increase the circuit scale which might cause an increase in power consumption.

In order to solve this problem, in recent years, a noncontact data carrier such as a noncontact tag which is equipped with a battery has been put to practical use (refer to Patent Document 1). The noncontact data carrier having the battery ensures a larger power relative to a battery-less data carrier by combining the power supply obtained from the reader/writer and the power supply obtained from the battery, and thereby performs complicated data processing and large-volume data processing for which stability of the power supply is required.

Hereinafter, a description will be given of a conventional battery-equipped noncontact data carrier. FIG. 18 is a diagram schematically illustrating the construction of a communication system comprising a conventional noncontact data carrier (referred to as a responder in FIG. 18) having a battery (referred to as a power supply part in FIG. 18), and a reader/writer (referred to as an interrogator in FIG. 18) which performs communication by a microwave with the noncontact data carrier. FIG. 19 is a waveform diagram illustrating the operation at startup of the conventional noncontact tag.

With reference to FIG. 18, the conventional battery-equipped responder 144 comprises an antenna 151 which receives a signal from the interrogator 141 and transmits a signal to the interrogator 141, a directional coupler 156 which transmits a transfer signal outputted from a transfer circuit 152 to the antenna 151 and transmits the signal received by the antenna 151 to a distributor 157, the distributor 157 which power-distributes the reception signal transmitted from the directional coupler 156 to a reception circuit 153 and to a wave detection circuit 158, a clock extraction circuit 156 which extracts a clock signal and a startup command from the output of the wave detection circuit 158, a judgment unit 160 which judges whether the extracted startup command matches a predetermined reference command for judgment or not, a CPU 161 which performs recognition of a command from the interrogator 141, processing based on the command, and generation of a response to the interrogator 141, a power supply unit 155 which supplies a power to the respective circuits in the responder 144, and a switch 154 which performs control for starting or stopping power supply from the power supply unit 155 on the basis of the judgment result of the judgment unit 160.

Power supply is continuously performed from the power supply unit 155 to the clock extraction circuit 159 and the judgment unit 160. Further, the directional coupler 156, the distributor 157, and the detection circuit 158 are operated with the power source received from the interrogator 141.

In this construction, when the responder 144 receives a signal including a startup command as shown in FIG. 19(a) from the interrogator 141, the received signal is transmitted through the directional coupler 156 and the divider 157 and detected by the wave detection circuit 158 in the responder 144. Then, a wave-detection signal (FIG. 19(b)) obtained in the wave detection circuit 158 is input to the clock extraction circuit 159, and the startup command is extracted. The startup command extracted by the clock extraction circuit 159 is input to the judgment unit 160, and it is judged whether or not a code of the startup command matches a code of a startup command for judgment which has previously been set. When there is a match, the output level is changed to turn on the switch 154 as shown in FIG. 19(c). When the switch 154 is turned on, power supply is started from the power supply unit 155 to the transmission circuit 152, the reception circuit 153, and the CPU 161, and consequently, the responder 144 is started up.

Patent Document 1: Japanese Published Patent Application No. 2005-80205

DISCLOSURE OF THE INVENTION

Problems to be Solved by the Invention

By the way, since the battery-equipped noncontact data carrier performs communication with the reader/writer using the power source supplied from the battery, it is necessary to perform communication with securing necessary communication reliability while suppressing consumption of the battery as much as possible.

In the above-described conventional responder 144, however, since power supply is constantly performed from the power supply unit 155, consumption of the power supply unit 155 is undesirably large.

Further, the conventional noncontact data carrier receives the startup command from the interrogator 141 in the state where power supply from the power supply unit 155 is not performed, i.e., in the state where power supply is performed by the power source obtained from the reception power from the interrogator 141, and performs a recognition operation for the startup command that is obtained in the imperfect communication state due to the imperfect power supply, by using the clock extraction circuit and the judgment circuit. Therefore, it is difficult to reliably start up the responder 144.

Further, in the conventional responder 144, complicated processing for judging the code type startup command by the judgment unit 160 is required, and further, startup of the responder 144 takes time due to this complicated processing.

The present invention is made to solve the above-described problems and has for its object to provide a convenient noncontact data carrier which can correctly perform startup of a battery-equipped noncontact data carrier, i.e., start of power supply from the battery to the respective circuits in the noncontact data carrier, even in a poor environment where the communication state with the reader/writer is not at an ideal level, and which can perform startup of the noncontact data carrier, i.e., start of power supply to the noncontact data carrier, without requiring a complicated code-type startup command, i.e., without requiring complicated data processing and processing time for judgment of the startup command.

Further, the present invention has another object to provide a noncontact data carrier which can enhance reliability in communication, and prevent insignificant dissipation of the battery.

Further, the present invention has still another object to provide, as a variation of a battery-equipped noncontact data carrier, a noncontact data carrier which can start up by the data carrier alone to perform necessary processings without receiving a startup command from the reader/writer.

Measures to Solve the Problems

In order to solve the above-described problems, there is provided a noncontact data carrier which performs radio communication with a reader/writer using electromagnetic wave or electromagnetically-induced binding via an antenna, comprising a power supply unit for obtaining a power source from a reception signal received by the antenna, a demodulation unit for demodulating the reception signal, a decoding unit for decoding the demodulated signal, a signal processing unit for performing data processing based on the contents of the decoded signal, and generation of a signal to be transmitted to the reader/writer, a coding unit for coding the signal to be transmitted to the reader writer, which signal is generated in the signal processing unit, a modulation unit for modulating the signal coded by the coding unit, a battery for performing power supply to a part of the noncontact data carrier or to the whole circuit, and a power supply control unit for controlling start or stop of the supply of electric power from the battery to a part of the noncontact data carrier or to the whole circuit on the basis of the signal state of the reception signal.

Therefore, according to the signal state of the reception signal received by the noncontact data carrier, start and stop of supply of electric power from the battery to the noncontact data carrier can be automatically controlled, thereby operating the data carrier with a stable power source that is supplied from the battery. This enhances the reliability in communication with the reader/writer, and increases the circuit scale for performing complicated data processing and large-volume data processing. Further, it is possible to prevent insignificant dissipation of the battery by preventing faulty startup due to an invalid reception signal and by providing a function of stopping the supply of electric power from the battery upon nondetection of the reception signal.

Further, in the noncontact data carrier according to the present invention, the power supply control unit comprises a level judgment unit for performing a first judgment as to whether or not the signal level of the reception signal is equal to or higher than a predetermined amplitude, and a time judgment unit for performing a second judgment as to whether the state where the reception signal is equal to or higher than the predetermined amplitude is continued for a predetermined period of time or not, after the first judgment is made by the level judgment unit, and the power supply control unit is constituted such that it starts supply of electric power from the battery to the noncontact data carrier when the second judgment is made by the time judgment unit after the first judgment has been made by the level judgment unit.

Therefore, supply of electric power from the battery to the noncontact data carrier can be automatically started according to the signal level and signal waveform of the reception signal while avoiding faulty startup of the noncontact data carrier due to noise, thereby enhancing the reliability in the startup operation of the noncontact data carrier, and avoiding insignificant dissipation of the battery due to faulty startup.

Further, in the noncontact data carrier according to the present invention, the level judgment unit further performs a third judgment for judging whether the signal level of the reception signal is lower than the predetermined amplitude or not, in addition to the first judgment, the time judgment unit further performs a fourth judgment for judging whether or not the state where the reception signal is lower than the predetermined amplitude is continued for a predetermined period of time or more after the third judgment is made by the level judgment unit, in addition to the second judgment, and the power supply control unit starts supply of electric power from the battery to the noncontact data carrier when the second judgment is made by the time judgment unit after the first judgment has been made by the level judgment unit, and stops the power supply when the fourth judgment is made by the timing judgment unit after the third judgment has been made in the level judgment unit.

Therefore, supply of electric power from the battery to the noncontact data carrier can be automatically stopped in response to stopping of the reception signal or invalidation of the reception signal, thereby avoiding insignificant dissipation of the battery during the noncommunication state while preventing faulty startup due to noise.

Further, in the noncontact data carrier according to the present invention, the power supply control unit comprises a level judgment unit for performing a first judgment as to whether or not the signal level of the reception signal is equal to or higher than a predetermined amplitude, and a time judgment unit for performing a second judgment as to whether the state where the reception signal is equal to or higher than the predetermined amplitude is continued for a predetermined period of time or not, after the first judgment is made by the level judgment unit, and the power supply control unit is constituted such that it starts supply of electric power from the battery to the noncontact data carrier when the first judgment is made by the level judgment unit, continues the power supply when the second judgment is made by the time judgment unit, and stops the power supply when the second judgment is not made.

Therefore, in the state where the reception sensitivity of the data carrier is enhanced to enable detection of a reception signal whose reception level is low, even if faulty startup of the data carrier occurs due to noise, startup cancellation is automatically performed by judging that the reception signal was noise after the faulty startup. Consequently, since faulty startup of the noncontact data carrier due to noise can be cancelled even when the reception sensitivity of the data carrier is increased, insignificant dissipation of the battery due to such faulty startup can be avoided without deteriorating the reliability in the startup operation of the data carrier.

Further, in the noncontact data carrier according to the present invention, the level judgment unit further performs a third judgment for judging whether the signal level of the reception signal is lower than a predetermined amplitude or not, in addition to the first judgment, the time judgment unit further performs a fourth judgment for judging whether the state where the reception signal is lower than the predetermined amplitude is continued for a predetermined period of time or not, after the third judgment is made by the level judgment unit, in addition to the second judgment, and the power supply control unit starts supply of electric power from the battery to the noncontact data carrier when the first judgment is made by the time judgment unit, and stops the power supply when the fourth judgment is made by the timing judgment unit after the third judgment is made by the level judgment unit under the state where the second judgment has been made by the time judgment unit.

Therefore, supply of electric power from the battery to the noncontact data carrier can be automatically stopped in response to stopping of the reception signal or invalidation of the reception signal, thereby avoiding insignificant dissipation of the battery in the noncommunication mode while preventing faulty startup due to noise.

Further, in the noncontact data carrier according to the present invention, the power supply control unit comprises a frequency judgment unit for performing a fifth judgment as to whether the frequency of the reception signal is included in a predetermined frequency range or not, and a time judgment unit for performing a sixth judgment as to whether the state where the frequency of the reception signal is included in the predetermined frequency range is continued for a predetermined period of time or not, after the first judgment is made by the frequency judgment unit, and the power supply control unit is constituted such that it starts supply of electric power from the battery to the noncontact data carrier when the sixth judgment is made by the time judgment unit after the fifth judgment has been made by the frequency judgment unit.

Therefore, supply of electric power from the battery to the noncontact data carrier can be automatically started according to the frequency and signal waveform of the reception signal while preventing faulty startup of the noncontact data carrier due to a signal having a different frequency, or a signal having a nonconstant frequency, as well as noise. Since the function of preventing faulty startup due to a signal having different frequency or a signal having nonconstant frequency as well as noise is added, the reliability in the startup operation of the noncontact data carrier is further enhanced, and insignificant dissipation of the battery due to faulty startup can be avoided.

Further, in the noncontact data carrier according to the present invention, the time judgment unit further performs a seventh judgment for judging whether the state where the frequency of the reception signal is not included in the frequency range is continued for a predetermined period of time or not, in addition to the sixth judgment, and the power supply control unit starts supply of electric power from the battery to the noncontact data carrier when the sixth judgment is made by the time judgment unit after the fifth judgment has been made by the frequency judgment unit, and stops the power supply when the seventh judgment is made by the time judgment unit.

Therefore, supply of electric power from the battery to the noncontact data carrier can be automatically stopped in response to stopping of the reception signal or invalidation of the reception signal, thereby avoiding insignificant dissipation of the battery in the noncommunication state while preventing faulty startup due to noise, or a signal having a different frequency, or a signal having a nonconstant frequency.

Further, in the noncontact data according to the present invention, the power supply control unit comprises a frequency judgment unit for performing a fifth judgment as to whether the frequency of the reception signal is included in a predetermined frequency range or not, and a time judgment unit for performing a sixth judgment as to whether the state where the frequency of the reception signal is included in the predetermined frequency range is continued for a predetermined period of time or not, after the fifth judgment is made by the frequency judgment unit, and the power supply control unit is constituted such that it starts supply of electric power from the battery to the noncontact data carrier when the fifth judgment is made by the frequency judgment unit, continues the power supply when the sixth judgement is made by the time judgment unit, and stops the power supply when the sixth judgment is not made.

Therefore, in the state where the reception sensitivity of the data carrier is enhanced to enable detection of a reception signal whose reception level is low, even if faulty startup of the data carrier occurs due to noise, or a signal having a different frequency, or a signal having a nonconstant frequency, startup cancellation is automatically performed by judging that the reception signal was noise, or a signal having a different frequency, or a signal having a nonconstant frequency after the faulty startup. Consequently, since faulty startup of the noncontact data carrier due to noise, or a signal having a different frequency, or a signal having a nonconstant frequency can be cancelled even when the reception sensitivity of the data carrier is increased, insignificant dissipation of the battery due to such faulty startup can be avoided without deteriorating the reliability in the startup operation of the data carrier.

Further, in the noncontact data carrier according to the present invention, the time judgment unit further performs a seventh judgment for judging whether the state where the frequency of the reception signal is not included in the frequency range is continued for a predetermined period of time or not, in addition to the sixth judgment, and the power supply control unit starts supply of electric power from the battery to the noncontact data carrier when the fifth judgment is made by the frequency judgment unit, and stops the power supply when the seventh judgment is made by the time judgment unit in the state where the sixth judgment has been made by the time judgment unit.

Therefore, supply of electric power from the battery to the noncontact data carrier can be automatically stopped in response to stopping of the reception signal or invalidation of the reception signal, thereby avoiding insignificant dissipation of the battery in the noncommunication state while preventing faulty startup due to noise, or a signal having a different frequency, or a signal having a nonconstant frequency.

Further, the noncontact data carrier according to the present invention further includes a sensor element, and a second power supply control unit for controlling start or stop of supply of electric power from the battery to the noncontact data carrier on the basis of a measurement amount that is measured by the sensor element, and the signal processing unit performs data processing based on the contents of the decoded signal, and/or data processing based on the measurement amount obtained by the sensor element, and/or generation of a signal to be transmitted to the reader/writer, and/or recording into the memory.

Therefore, even in the state where the noncontact data carrier is placed outside the communication area of the reader/writer and cannot obtain the power source from the reception signal supplied from the reader/writer, supply of electric power from the battery provided in the data carrier to the data carrier is automatically started according to the measurement amount obtained in the sensor element, and thereby the data carrier alone can execute necessary processing based on the measurement value of the sensor element by the supply of electric power from the battery.

Further, in the noncontact data carrier according to the present invention, the second power supply control unit automatically starts supply of electric power from the battery to the noncontact data carrier on the basis of the measurement amount obtained by the sensor element, and stops the power supply when a processing that is predetermined based on the measurement amount, which has been started by the signal processing unit, is stopped.

Therefore, even when supply of electric power from the battery to the data carrier is automatically started according to the measurement value obtained in the sensor element, the supply of electric power from the battery is automatically stopped when the necessary processing is completed, thereby avoiding insignificant dissipation of the battery during the non-operating mode.

Further, the noncontact data carrier according to the present invention further includes the battery being a chargeable secondary cell, a charging voltage judgment unit for measuring the terminal voltage of the battery, and performing an eighth judgment for judging whether the measured terminal voltage is smaller than a predetermined first voltage value, and a ninth judgment for judging whether or not the terminal voltage is equal to or larger than a predetermined second voltage, and a charging control unit for controlling charging of the battery by the power supply unit that extracts the power source from the reception signal, on the basis of the judgment result obtained by the charging voltage judgment unit, and whether a charging permission signal with which the reader/writer permits the noncontact data carrier to charge the battery is received or not, and whether a charging stop signal with which the reader/writer makes the noncontact data carrier stop the charging to the battery is received or not, and the charging control unit starts charging to the battery when the noncontact data carrier receives the charging permission signal from the reader/writer and the eighth judgment is made by the charging voltage judgment unit, and stops the charging when the ninth judgment is made by the charging voltage judgment unit or when it receives the charging stop signal from the reader/writer.

Therefore, since the battery included in the noncontact data carrier can be charged, the data carrier can be repeatedly used. In addition, since the charging of the battery can be interrupted or restarted according to the charging permission signal and the charging stop signal from the reader/writer, it is possible to continue the charging of the battery while ensuring a necessary communication between the reader/writer and a data carrier other than the data carrier performing the charging, which communication may occur periodically or suddenly.

Effects of the Invention

A noncontact data carrier according to the present invention comprises an antenna for performing radio communication with a reader/writer using electromagnetic wave or electromagnetically-induced binding, a power supply unit for obtaining a power source from a reception signal received by the antenna, a demodulation unit for demodulating the reception signal, a decoding unit for decoding the demodulated signal, a signal processing unit for performing data processing based on the contents of the decoded signal, and generation of a signal to be transmitted to the reader/writer, a coding unit for coding the signal to be transmitted to the reader writer, which signal is generated in the signal processing unit, a modulation unit for modulating the signal coded by the coding unit, a battery for performing power supply to a part of the noncontact data carrier or to the whole circuit, and a power supply control unit for controlling start or stop of the supply of electric power from the battery to a part of the noncontact data carrier or to the whole circuit on the basis of the signal state of the reception signal. Therefore, according to the signal state of the reception signal received by the noncontact data carrier, start and stop of supply of electric power from the battery to the noncontact data carrier can be automatically controlled, thereby operating the data carrier with a stable power source that is supplied from the battery. This enhances the reliability in communication with the reader/writer, and increases the circuit scale for performing complicated data processing and large-volume data processing. Further, it is possible to prevent insignificant dissipation of the battery by preventing faulty startup due to an invalid reception signal and by providing a function of stopping the supply of electric power from the battery upon nondetection of the reception signal.

Further, according to the noncontact data carrier of the present invention, the signal level and/or the frequency of the reception signal received from the reader/writer is judged as to whether the value of the signal level and/or the frequency satisfies a predetermined condition or not, and the continuity of the state where the condition is satisfied is judged, thereby to start or stop supply of electric power from the battery. Therefore, control for start or stop of the supply of electric power from the battery can be performed with respect to reception of an effective startup signal while preventing faulty startup due to reception of noise, or a signal having a different frequency, or a signal having a nonconstant frequency, thereby enhancing the reliability in the startup operation of the noncontact data carrier, and avoiding insignificant dissipation of the battery due to faulty startup or insignificant dissipation of the battery during the non-operating mode.

Further, according to the present invention, the noncontact data carrier is provided with a sensor element, and a second power supply control unit for controlling start or stop of supply of electric power from the battery to the noncontact data carrier on the basis of a measurement amount that is measured by the sensor element. Therefore, even when the noncontact data carrier does not exist in the communication area of the reader/writer, the noncontact data carrier alone can start up when the measurement amount of the sensor element satisfies a predetermined condition, and execute necessary processing for the measurement amount obtained from the sensor element.

Further, according the noncontact data carrier of the present invention, the battery is a chargeable secondary cell, and the noncontact data carrier further includes a charging voltage judgment unit for measuring the terminal voltage of the battery, and judging whether the measured terminal voltage has a voltage value which requires charging of the battery or not, and a charging control unit for controlling charging of the battery by the power supply unit that extracts the power source from the reception signal, on the basis of the judgment result obtained by the charging voltage judgment unit, and whether a charging permission signal with which the reader/writer permits the noncontact data carrier to charge the battery is received or not, and whether a charging stop signal with which the reader/writer makes the data carrier stop the charging to the battery is received or not. Therefore, the battery included in the noncontact data carrier can be charged, and thereby the data carrier can be repeatedly used. In addition, since the charging of the battery can be interrupted or restarted according to the charging permission signal and the charging stop signal from the reader/writer, it is possible to continue the charging of the battery while ensuring a necessary communication between the reader/writer and a data carrier other than the data carrier performing the charging, which communication may occur periodically or suddenly.

BRIEF DESCRIPTION OF THE DRAWINGS

FIG. 19 is a waveform diagram illustrating the operation at startup of a conventional noncontact tag.

DESCRIPTION OF REFERENCE NUMERALS

Figure 1:
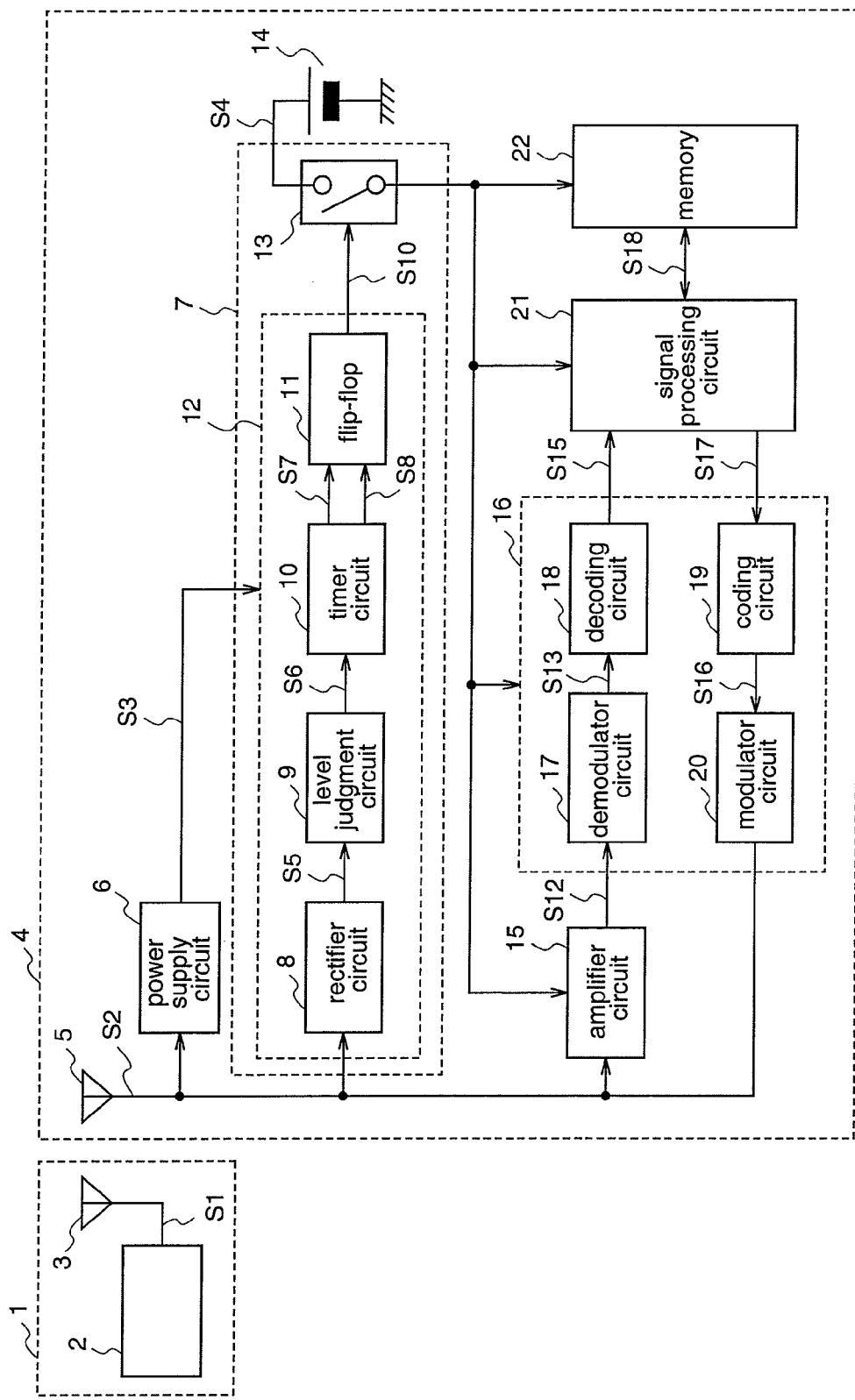
FIG. 1 is a diagram illustrating a circuit construction of a communication system including a data carrier according to a first embodiment and a reader/writer.

1 . . . reader/writer
2 . . . internal circuit of reader/writer
3 . . . antenna of reader/writer
4, 50, 60, 70, 80, 90 . . . data carrier
5 . . . antenna of data carrier
6 . . . power supply circuit
7, 51, 61, 71, 81 . . . power supply control unit
8 . . . rectifier circuit
9 . . . level judgment circuit
10,53 . . . timer circuit
11, 84, 93 . . . flip-flop
12, 52, 62, 72, 83, 92 . . . switch controller
13, 54, 55, 82, 91 . . . switch
14 . . . battery
15 . . . amplifier circuit
16 . . . communication circuit
17 . . . demodulator circuit
18 . . . decoding circuit
19 . . . coding circuit
20 . . . modulator circuit
21, 88, 95 . . . signal processing circuit
22 . . . memory
63 . . . frequency judgment circuit
85 . . . sensor signal judgment circuit
86 . . . sensor element
87 . . . sensor circuit
94 . . . charging voltage judgment circuit
141 . . . reader writer (interrogator) communicating with data carrier
144 . . . conventional noncontact data carrier (responder) equipped with battery
152 . . . transmitting circuit
153 . . . receiving circuit
154 . . . switch
155 . . . battery (power supply unit)
156 . . . directional coupler
157 . . . divider
158 . . . detection circuit
159 . . . clock extraction circuit
160 . . . judgment unit
161 . . . CPU
S1 . . . transmission/reception signal of reader writer 1
S2 . . . transmission/reception signal of data carrier 4
S3 . . . power source extracted from reception signal S2 by power supply circuit 6
S4 . . . power source from battery 14
S5 . . . rectified signal
S6 . . . level judgment signal
S7 . . . first set signal
S8 . . . first reset signal
S10 . . . first switch control signal
S12 . . . amplified signal
S13 . . . demodulated signal
S15 . . . decoded signal
S16 . . . coded signal
S17 . . . binary response signal
S18 . . . memory signal
S60 . . . frequency judgment signal
S81 . . . second switch control signal S82 . . . second set signal
S84 . . . second reset signal
S85 . . . digitized sensor signal
S86 . . . sensor signal
S91 . . . third switch control signal
S93 . . . third set signal
S94 . . . third reset signal
S95 . . . charging voltage judgment signal

BEST MODE TO EXECUTE THE INVENTION

Embodiment 1

Hereinafter, a first battery-equipped noncontact data carrier according to a first embodiment of the present invention will be described with reference to FIGS. 1 to 3.

In this first embodiment, control for power supply from the battery to the noncontact data carrier is performed based on the signal level and signal waveform of a reception signal received from a reader/writer.

Figure 2:
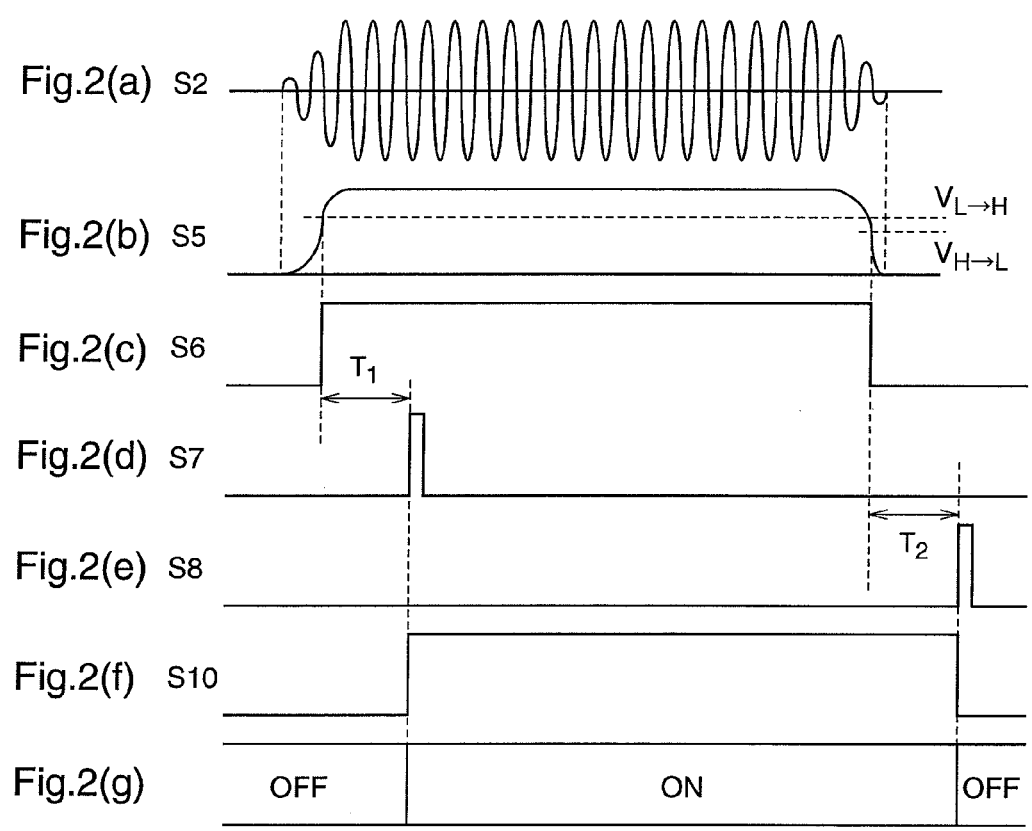
FIG. 2 is a waveform diagram illustrating signals outputted from the respective circuits in a power supply control unit when the data carrier according to the first embodiment receives a signal from the reader/writer.

FIG. 1 is a diagram illustrating a circuit construction of a communication system comprising a noncontact data carrier according to the first embodiment (hereinafter referred to simply as "data carrier") and a reader/writer.

The reader/writer 1 comprises an internal circuit 2 and an antenna 3, and the internal circuit 2 and the antenna 3 are electrically connected.

The data carrier 4 according to the first embodiment comprises a antenna 5, a power supply circuit 6 for extracting a power source S3 from a reception signal S2 received by the antenna 5, an amplifier circuit 15 for amplifying the reception signal S2, a communication circuit 16 for performing modulation/demodulation and coding/decoding for performing bidirectional communication with the reader/writer 1, a signal processing circuit 21 for performing processing for a command from the reader/writer 1, and/or data processing required for the command, and/or generation of a response to the reader/writer, and/or access to a memory 22, a memory 22, a battery 14, and a power supply control unit 7 for controlling power supply from the battery 14 to the data carrier 4.

The communication circuit 16 includes, as reception circuits, a demodulation circuit 17 for demodulating the amplified signal S12, and a decoding circuit 18 for decoding a demodulated signal S13 obtained from the demodulation circuit 17, and includes, as transmission circuits, a coding circuit 19 for coding a binary response signal S17 to be returned to the reader/writer 1, which signal is generated by the signal processing circuit 21, and a modulation circuit 20 for modulating a coded signal S16 obtained from the coding circuit 19.

The power supply control unit 7 comprises an electronic switch 13 (hereinafter referred to simply as "switch") constituted by a MOS-FET, and a switch controller 12 for controlling ON/OFF of the switch 13 on the basis of the signal level and signal waveform of the reception signal S2. The switch controller 12 comprises a rectifier circuit 8 for rectifying the reception signal S2, a level judgment circuit 9 for comparing the level of a rectified signal S5 obtained from the rectifier circuit 8 with a predetermined reference level, and outputting a level judgment signal S6 indicating the comparison result, a timer circuit 10 for judging whether or not the level judgment signal S6 is in the enable state for a predetermined monitoring period or more, and controlling the state of a subsequent flip-flop 11 on the basis of the judgment result, and the flip-flop circuit 11 for outputting a switch control signal S10 which performs ON/OFF control for the switch 13 under the control of the timer circuit 10.

In this first embodiment, the switch 13 controls power supplies from the battery 14 to the amplifier circuit 15, the communication circuit 16, the signal processing circuit 21, and the memory 22 in the data carrier 4 on the basis of the switch control signal S10. The switch control signal S10 turns the switch 13 to the OFF state when the flip-flop 11 is in the reset state, and turns the switch 13 to the ON state when the flip-flop 11 is in the set state. Further, in the initial state immediately after the power source S3 is turned on, the flip-flop 11 is in the reset state, and therefore, the switch 13 is in the OFF state during the initial state. Further, the switch 13 requires no power source.

Hereinafter, the operation of the noncontact data carrier according to the first embodiment will be described.

When the data carrier 4 is within the communication area of the reader/writer 1, the data carrier 4 starts reception of the signal S1 transmitted from the reader/writer 1, via the antenna 5. The reception signal S2 received via the antenna 5 is input to the power supply circuit 6, the rectifier circuit 8, and the amplifier circuit 15.

When the reception signal S2 is input to the power supply circuit 6, the power supply circuit 6 extracts the power source S3 from the reception signal S2, and supplies the power source S3 to the switch controller 12 in the power supply control unit 7. Thereby, in the power supply control unit 7, the switch controller 12 judges whether or not the signal level of the reception signal S2 transmitted from the reader/writer 1 is equal to or higher than a predetermined reference level, and judges the continuity of this state when it is equal to or higher than the reference level, and ON/OFF control for the switch 13 is carried out on the basis of the judgment result.

Hereinafter, the operation of controlling the power supply from the battery 14 in the power supply control unit 7 will be described with reference to FIG. 2. FIG. 2 is a waveform diagram illustrating the signals outputted from the respective circuits in the power supply control unit when the data carrier of the first embodiment receives a signal from the read/writer, wherein (a) shows the reception signal S2, (b) shows the rectified signal S5, (c) shows the level judgment signal S6, (d) shows the set signal S7, (e) shows the reset signal S8, (f) shows the switch control signal S10, and (g) shows the ON/OFF state of the switch 13. In FIGS. 2(c) and 2(f), logic "1" shows the enable state and logic "0" shows the disenable state.

Initially, the reception signal S2 (refer to FIG. 2(a)) received by the antenna 5 is input to the switch controller 12 which is operated with the power source S3 extracted from the power supply circuit 6.

In the switch controller 12, initially, the rectifier circuit 8 rectifies the reception signal S2 (refer to FIG. 2(b)), and the level judgment circuit 9 compares the level of the rectified signal S5 with a predetermined rising threshold value $V_{L \to H}$, and sets the level judgment signal S6 in the enable state (refer to FIG. 2(c)) when the level of the rectified signal S5 is equal to or higher than the rising threshold value $V_{L \to H}$.

Thereafter, in the switch controller 12, in order to avoid faulty startup of the data carrier 4 due to noise, i.e., a signal which appears for a short time, the timer circuit 10 judges whether or not the enable state of the level judgment signal S6 continues for a predetermined monitoring period $T_1$ or more. At the timing when it is judged that the level judgment signal S6 has been in the enable state continuously for the monitoring period $T_1$ or more, the set signal S7 is outputted from the timer circuit 10 (refer to FIG. 2(d)), and the flip-flop 11 goes into the set state.

When the flip-flop 11 enters the set state, the flip-flop 11 sets the switch control signal S10 in the enable state (refer to FIG. 2(f)), and changes the switch 13 from the OFF state to the ON state (refer to FIG. 2(g)). Thereby, supply of the power supply S4 from the battery 14 to the amplifier circuit 15, the communication circuit 16, the signal processing circuit 21, and the memory 22 is started.

As described above, the power source S4 is supplied to the amplifier circuit 15, the communication circuit 16, the signal processing circuit 21, and the memory 22 in the data carrier 4, whereby the normal operation, i.e., recognition of a command issued by the reader/writer 1 from the reception signal S2, and/or data processing required for the command, and/or generation of a response for the command to the reader/writer 1, is started in the data carrier 4.

To be specific, the reception signal S2 received from the reader/writer 1 is amplified by the amplifier circuit 15 and then input to the communication circuit 16. In the communication circuit 16, the signal S2 is demodulated by a prescribed demodulation method in the demodulator circuit 17, and further, decoded by a prescribed decoding method in the decoding circuit 18, and then input to the signal processing circuit 21. In the signal processing circuit 21, recognition of a command transmitted from the reader/writer 1, and/or signal processing based on the contents of the command, and/or access to the memory 22, and/or generation of a binary response signal S17 to be returned to the reader/writer 1 are carried out based on the decoded signal S15. The response signal S17 is input to the communication circuit 16, encoded by a prescribed coding method in the coding circuit 19, and modulated by a prescribed modulation method in the modulator circuit 20, and thereafter, transmitted to the reader/writer 1 via the antenna 5.

In addition, in the level judgment circuit 9, after it is judged that the level of the rectified signal S5 is equal to or higher than the rising threshold value $V_{L \to H}$, the level of the rectified signal S5 is compared with a predetermined falling threshold value $V_{H \to L}$. At the timing when the level of the rectified signal S5 becomes smaller than the falling threshold value $V_{H \to L}$, the level judgment signal S6 is again set into the disenable state (refer to FIG. 2(c)).

Thereafter, in the timer circuit 10, in order to avoid influences by amplitude reduction of the reception signal S2 which is caused by amplitude modulation during the normal communication, it is judged whether or not the disenable state of the level judgment signal S6 is continued for a monitoring period $T_2$ or more, which is sufficiently larger than a predetermined maximum value of the amplitude modulation period that appears during the normal communication, and when it is judged that the disenable state of the level judgment signal S6 has been continued for the monitoring period $T_2$ or more, a reset signal S8 is outputted to put the flip-flop 11 into the reset state (refer to FIG. 2(e)).

When the flip-flop 11 enters the reset state, the flip-flop 11 sets the switch control signal S10 into the disenable state (refer to FIG. 2(f)), and turns the switch 13 from the ON state to the OFF state (refer to FIG. 2(g)). Thereby, supply of the power S4 from the battery 14 to the amplifier circuit 15, the communication circuit 16, the signal processing circuit 21, and the memory 22 is stopped, and the data carrier 4 again goes into the stand-by state.

Hereinafter, a description will be given of the power supply control operation of the power supply control unit 7 according to the first embodiment in the case where noise is superposed on the reception signal S2. FIG. 3 is a waveform diagram illustrating the signals outputted from the respective circuits in the power supply control unit in the case where the non-contact data carrier of the first embodiment receives a signal on which noise is superposed, wherein (a) shows the reception signal S2, (b) shows the rectified signal S5, (c) shows the level judgment signal S6, (d) shows the set signal S7, (e) shows the reset signal S8, (f) shows the switch control signal S10, and (g) shows the ON/OFF state of the switch 13. In FIGS. 3(c) and 3(f), logic "1" shows the enable state and logic "0" shows the disenable state.

Initially, the reception signal S2 (refer to FIG. 3(a)) received by the antenna 5 is input to the switch controller 12.

In the switch controller 12, initially, the rectifier circuit 8 rectifies the reception signal S2 (refer to FIG. 3(b)), and the level judgment circuit 9 compares the level of the rectified signal S5 with the rising threshold value $V_{L \to H}$, and sets the level judgment signal S6 into the enable state when the level of the rectified signal S5 becomes equal to or higher than the rising threshold value $V_{L \to H}$ (refer to FIG. 3(c)).

Thereafter, in the switch controller 12, in order to avoid faulty startup of the data carrier 4 due to noise, the timer circuit 10 judges whether or not the enable state of the level judgment signal S6 is continued for the monitoring period $T_1$ or more. However, since the reception signal S2 is a noise which appears in a short period relative to the monitoring period $T_1$ as shown in FIG. 3(a), the level of the rectified signal S5 immediately becomes smaller than the falling threshold value $V_{H \to L}$ within a period shorter than the monitoring period $T_1$, and therefore, the enable state of the level judgment signal S6 returns to the disenable state without continuing for the monitoring period $T_1$. Accordingly, the timer circuit 10 does not output a set signal S7 (refer to FIG. 3(d)), and the flip-flop 11 maintains the reset state, and thereby the switch control signal S10 is kept in the disenable state (refer to FIG. 3(f)). As the result, even when noise is inputted, the switch 13 is not turned on but is kept in the OFF state (refer to FIG. 3(g)), whereby supply of the power source S4 from the battery 14 to the amplifier circuit 15, the communication circuit 16, the signal processing circuit 21, and the memory 22 is prevented from being started due to the noise, i.e., faulty startup of the data carrier 4 due to the noise is prevented.

As described above, according to the first embodiment, the data carrier 4 includes the power supply control unit 7 for controlling power supply from the battery 14 on the basis of the signal level and signal waveform of the reception signal S2, and the power supply control unit 7 in the data carrier 4 is operated with the power source S3 obtained from the reception signal S2, while the other circuits in the data carrier 4 are operated with the power source S4 supplied from the battery 14 under the control of the power supply control unit 7. Therefore, supply of electric power from the battery 14 to the data carrier 4 can be automatically started or stopped according to the signal level or signal waveform of the reception signal S2 when the data carrier 4 is within the communication area of the reader/writer 1, and the supply of electric power from the battery 14 can be automatically stopped when the data carrier 4 is placed outside the communication area of the reader/writer 1, thereby providing a convenient data carrier 4 which can avoid insignificant dissipation of the battery.

Further, according to the first embodiment, the power supply control unit 7 performs control so as to start power supply from the battery 14 when it is judged that the state where the signal level of the reception signal S2 from the reader/writer 1 is equal to or higher than the predetermined rising threshold value $V_{L \to H}$ has continued for the predetermined monitoring period $T_1$, and performs control so as to stop the power supply from the battery 14 when it is judged that the state where the signal level of the reception signal S2 is smaller than the predetermined falling threshold value $V_{H \to L}$ has continued for the predetermined monitoring period $T_2$. Therefore, faulty startup of the data carrier 4 due to noise can be avoided, thereby enhancing the reliability in the startup operation, and preventing insignificant dissipation of the battery due to faulty startup.

That is, according to the first embodiment, it is possible to provide a noncontact data carrier which can realize ensuring of reliability in the startup operation which can prevents faulty startup due to noise, and prevention of insignificant dissipation of the battery due to faulty startup.

Furthermore, since the signal processing for the reception signal S2 or the communication processing can be performed under the state where stable power supply is carried out by the battery 14, communication reliability at a practical level can always be ensured between the data carrier 1 and the reader/writer 1.

Embodiment 2

Figure 5:
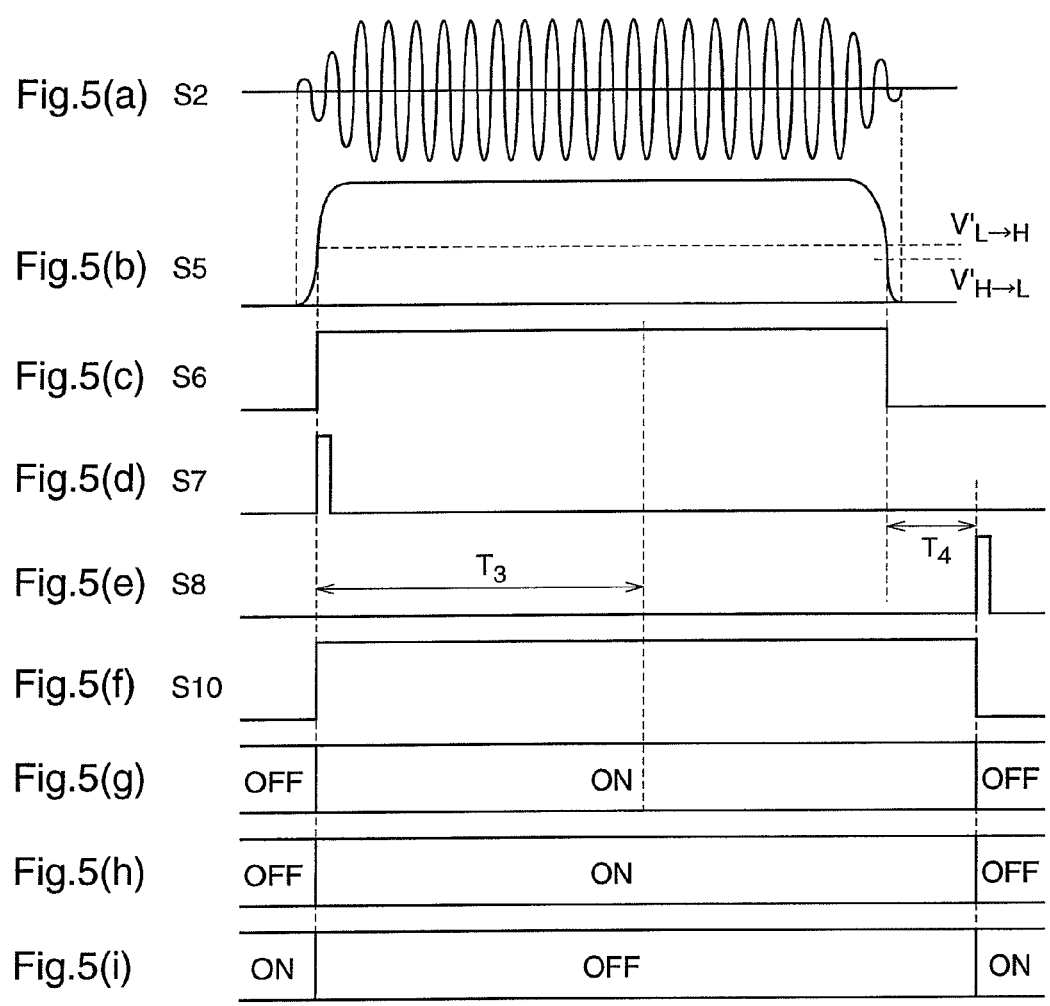
FIG. 5 is a waveform diagram illustrating signals outputted from the respective circuits in a power supply control unit when the data carrier according to the second embodiment receives a signal from the reader/writer.
Figure 6:
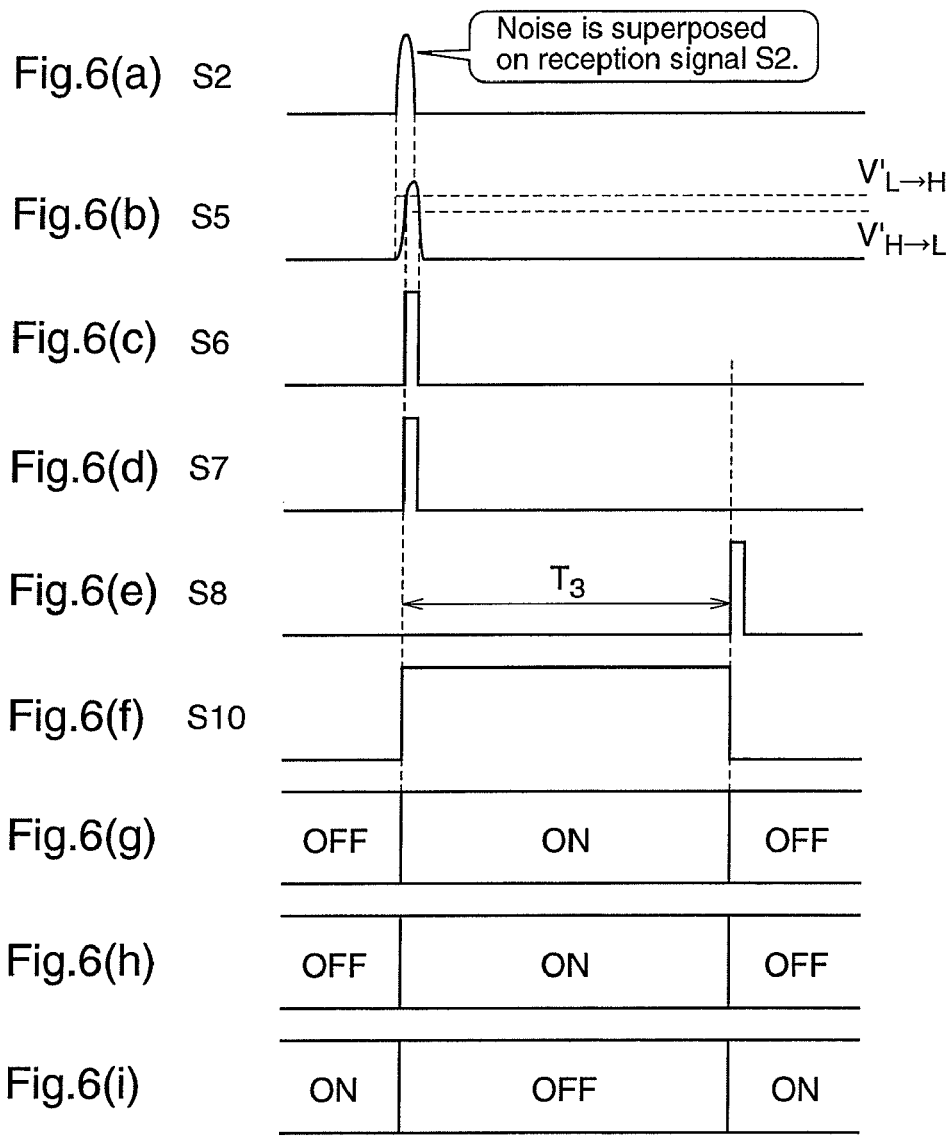
FIG. 6 is a waveform diagram illustrating signals outputted from the respective circuits in the power supply control unit when the data carrier according to the second embodiment receives a signal on which noise is superposed.

Hereinafter, a second battery-equipped noncontact data carrier according to a second embodiment of the present invention will be described with reference to FIGS. 4 to 6.

While in the data carrier of the first embodiment the power supply from the battery is started after the continuity of the reception signal level equal to or higher than the predetermined value for the predetermined period or more is confirmed, in this second embodiment the power supply from the battery is started when the reception signal level equal to or higher than the predetermined value is recognized, and then the continuity of the reception signal equal to or higher than the predetermined value for the predetermined period or more is confirmed, and the power supply from the battery is terminated only when the reception signal level has not continued for the predetermined period.

Figure 4:
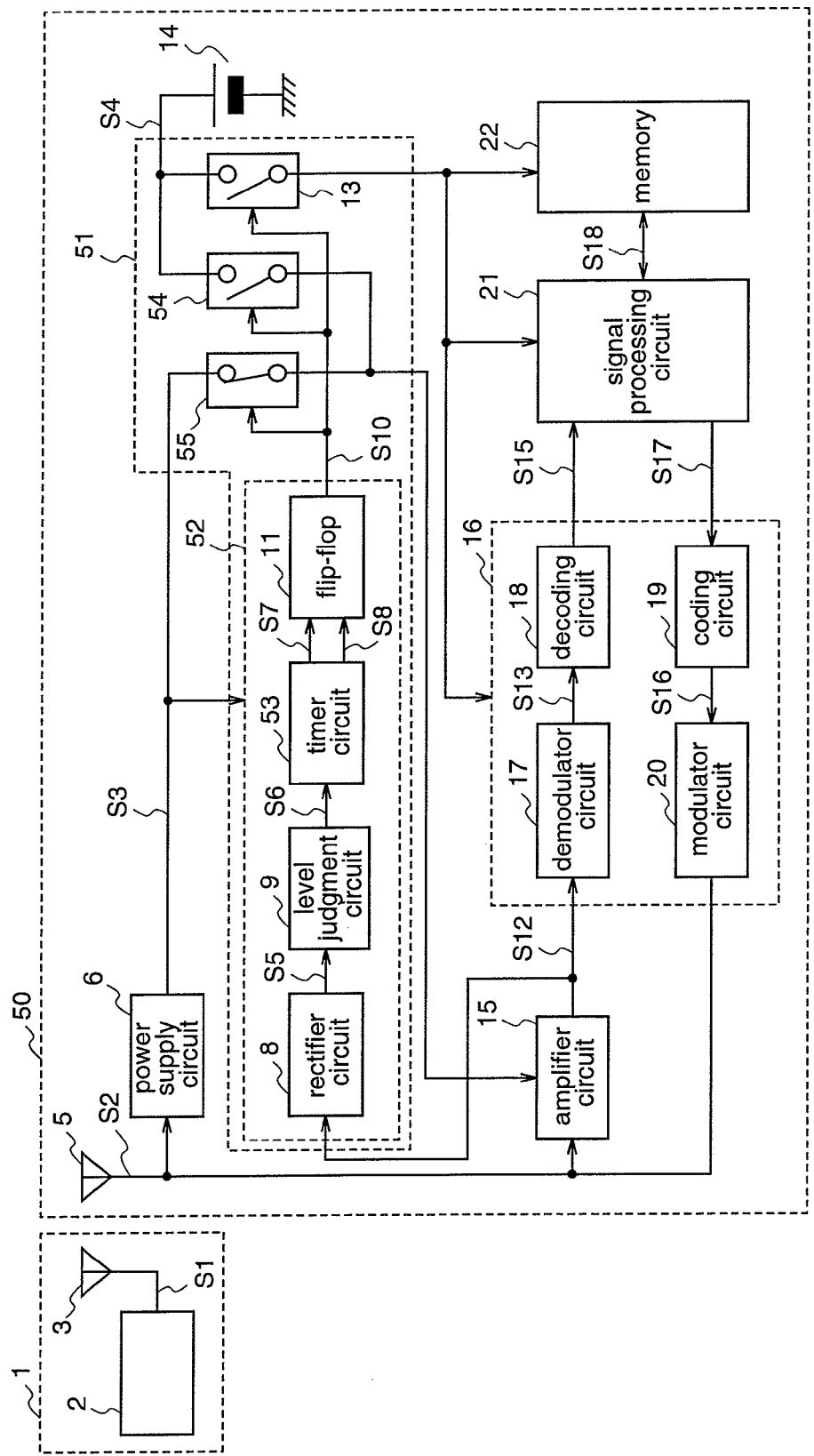
FIG. 4 is a diagram illustrating a circuit construction of a communication system including a data carrier according to a second embodiment and a reader/writer.

FIG. 4 is a diagram illustrating a circuit construction of a communication system comprising the data carrier of the second embodiment and a reader/writer.

The data carrier 50 according to the second embodiment is provided with an antenna 5, a power supply circuit 6, an amplifier circuit 15, a communication circuit 16, a signal processing circuit 21, a memory 22, a battery 14, and a power supply control unit 51.

The power supply control unit 51 according to the second embodiment controls supply of a power source S4 from the battery 14 to the data carrier 50, and supply of a power source S3 from the power supply circuit 6 to the data carrier 50, and it is provided with first to third switches 13, 54, and 55 comprising MOS-FETs, and a switch controller 52 for performing ON/OFF control for the switches 13, 54, and 55 on the basis of the signal level and signal waveform of an amplified signal S12 obtained in the amplifier circuit 15. The second and third switches 54 and 55 are identical to the first switch 13, and require no power supply.

The switch controller 52 comprises a rectifier circuit 8 for rectifying the amplified signal S12 obtained from the amplifier circuit 15, a level judgment circuit 9 for comparing the level of a rectified signal S5 with a predetermined reference level and outputting a level judgment signal S6 indicating the comparison result, a timer circuit 53 for judging whether or not the level judgment signal S6 is in the enable state for a predetermined monitoring period or more, and controlling the state of a subsequent flip-flop 11 on the basis of the judgment result, and the flip-flop circuit 11 for outputting a switch control signal S10 that controls ON/OFF of the first to third switches 13, 54, and 55 under the control of the timer circuit 53.

In this second embodiment, the first switch 13 controls supply of the power source S4 from the battery 14 to the communication circuit 16, the signal processing circuit 21, and the memory 22 on the basis of the switch control signal S10, and the second switch 54 controls supply of the power source S4 from the battery 14 to the amplifier circuit 15 on the basis of the switch control signal S10, and further, the third switch 55 controls supply of the power source S3 from the power supply circuit 6 to the amplifier circuit 15 on the basis of the switch control signal S10. The switch control signal S10 turns off the first switch 13 and the second switch 54 and turns on the third switch 55 when the flip-flop 11 is in the reset state, and it turns on the first switch 13 and the second switch 54 and turns off the third switch 55 when the flip-flop 11 is in the set state. Further, the flip-flop 11 is in the reset state during the initial mode immediately after the power source S3 is turned on, and accordingly, the first switch 13 and the second switch 54 are in the OFF states while the third switch 55 is in the ON state during the initial mode.

Hereinafter, the operation of the noncontact data carrier according to the second embodiment will be described.

When the data carrier 50 is within the communication area of the reader/writer 1, the data carrier 50 starts reception of a signal S1 transmitted from the reader/writer 1, via the antenna 5. A reception signal S2 received via the antenna 5 is input to the power supply circuit 6 and the amplifier circuit 15.

When the reception signal S2 is input to the power supply circuit 6, the power supply circuit 6 extracts a power source S3 from the reception signal S2, and supplies the power source S3 to the switch controller 52 in the power supply control unit 51 and to the amplifier circuit 15 via the third switch 55. Thereby, in the amplifier circuit 15, the reception signal S2 that is transmitted from the reader/writer 1 and received by the data carrier 50 is amplified. In the power supply control unit 51, the switch controller 52 judges whether or not the signal level of the amplified signal S2 from the amplifier circuit 15 is equal to or higher than a predetermined reference level, and judges the continuity of this state when the signal level is equal to or higher than the reference level, and ON/OFF control for the switches 13, 54, and 55 is carried out on the basis of the judgment result.

Hereinafter, the operation of controlling the power supply from the battery 14 in the power supply control unit 51 will be described with reference to FIG. 5. FIG. 5 is a waveform diagram illustrating the signals outputted from the respective circuits in the power supply control unit when the data carrier of the second embodiment receives a signal from the read/writer, wherein (a) shows the reception signal S2, (b) shows the rectified signal S5, (c) shows the level judgment signal S6, (d) shows the set signal S7, (e) shows the reset signal S8, (f) shows the switch control signal S10, (g) shows the ON/OFF state of the first switch 13, (h) shows the ON/OFF state of the second switch 54, and (i) shows the ON/OFF state of the third switch 55. In FIGS. 5(c) and 5(f), logic "1" shows the enable state and logic "0" shows the disenable state.

Initially, the reception signal S2 (refer to FIG. 5(a)) received by the antenna 5 is input to the amplifier circuit 15 which is operated by the power source S3 extracted from the power supply circuit 6, and amplified. Then, the amplified signal S12 obtained from the amplifier circuit 15 is input to the switch control unit 52 which is operated by the power source S3. Thereby, even when the signal level of the reception signal S2 received by the antenna 5 is low, the reception signal S2 can be detected with a high sensitivity in the power control unit 51.

In the switch controller 52, initially, the rectifier circuit 8 rectifies the amplified signal S12 (refer to FIG. 5(b)), and the level judgment circuit 9 compares the level of the rectified signal S5 with a predetermined rising threshold value $V'_{L \to H}$, and sets the level judgment signal S6 into the enable state when the level of the rectified signal S5 is equal to or higher than the rising threshold value $V'_{L \to H}$ (refer to FIG. 5(c)).

When the timer circuit 53 according to the second embodiment receives the level judgment signal S6 in the enable state, it outputs a set signal S7 to put the flip-flop 11 into the set state (refer to FIG. 5(d)). When the flip-flop 11 enters the set state, the flip-flop 11 sets the switch control signal S10 into the enable state (refer to FIG. 5(f)), and changes the first switch 13 and the second switch 54 from the OFF states to the ON states and changes the third switch 55 from the ON state to the OFF state (refer to FIGS. 5(g) to 5(i)). Thereby, supply of the power source S3 from the power supply circuit 6 to the amplifier circuit 15 is stopped, and supply of the power source S4 from the battery 14 to the amplifier circuit 15, the communication circuit 16, the signal processing circuit 21, and the memory 22 is started.

As described above, the power source S4 is supplied to the amplifier circuit 15, the communication circuit 16, the signal processing circuit 21, and the memory 22 in the data carrier 50, whereby the normal operation, i.e., recognition of a command issued by the reader/writer 1 from the reception signal S2, and/or data processing required for the command, and/or generation of a response for the command to the reader/writer 1, is started in the data carrier 50. This normal operation is similar to that described for the first embodiment.

In the switch control unit 52 according to the second embodiment, in order to cancel faulty startup of the data carrier 50 due to noise after the normal operation is thus started, the timer circuit 53 monitors whether or not the enable state of the level judgment signal S6 continues for a predetermined monitoring period $T_3$ or more.

As the result of the monitoring, if the level judgment signal S6 goes into the disenable state without maintaining the enable state for the monitoring period $T_3$, the reception signal S2 received by the antenna 5 is judged as not an effective signal transmitted from the reader/writer 1 but a noise, and the timer circuit 53 outputs a reset signal S8 after the monitoring period $T_3$ has passed, thereby to reset the flip-flop 11. The operation of the power supply control unit 51 in the case where the reception signal S2 is judged as a noise will be described later.

In addition, in the level judgment circuit 9, after it is judged that the level of the rectified signal S5 is equal to or higher than the rising threshold value $V'_{L \to H}$, the level of the rectified signal S5 is compared with a predetermined falling threshold value $V'_{H \to L}$. At the timing when the level of the rectified signal S5 becomes smaller than the falling threshold value $V'_{H \to L}$, the level judgment signal S6 is again set into the disenable state (refer to FIG. 5(c)).

Thereafter, in the timer circuit 53, in order to avoid influences by amplitude reduction of the reception signal S2 which is caused by amplitude modulation during the normal communication, it is judged whether or not the disenable state of the level judgment signal S6 continues for a monitoring period $T_4$ or not, which is sufficiently larger than the maximum value of the amplitude modulation period that appears in the normal communication, and when it is judged that the disenable state of the level judgment signal S6 has continued for the monitoring period $T_4$ or more, a reset signal S8 is output to reset the flip-flop 11 (refer to FIG. 5(e)).

When the flip-flop 11 enters the reset state, the flip-flop 11 sets the switch control signal S10 into the disenable state (refer to FIG. 5(f)), and changes the first switch 13 and the second switch 54 from the ON states to the OFF states and changes the third switch 55 from the OFF state to the ON state (refer to FIGS. 5(g) to 5(i)). Thereby, supply of the power source S4 from the battery 14 to the amplifier circuit 15, the communication circuit 16, the signal processing circuit 21, and the memory 22 is stopped, and simultaneously, supply of the power source S3 from the power supply circuit 6 to the amplifier circuit 15 is started, and then the data carrier 50 again goes into the stand-by state.

Hereinafter, a description will be given of the control operation by the power supply control unit 51 according to the second embodiment in the case where noise is superposed on the reception signal S2. FIG. 6 is a waveform diagram illustrating the signals outputted from the respective circuits in the power supply control unit in the case where the noncontact data carrier of the second embodiment receives a signal on which noise is superposed, wherein (a) shows the reception signal S2, (b) shows the rectified signal S5, (c) shows the level judgment signal S6, (d) shows the set signal S7, (e) shows the reset signal S8, (f) shows the switch control signal S10, (g) shows the ON/OFF state of the first switch 13, (h) shows the ON/OFF state of the second switch 54, and (i) denotes the ON/OFF state of the third switch 55. In FIGS. 6(c) and 6(f), logic "1" shows the enable state and logic "0" shows the disenable state.

Initially, the reception signal S2 received by the antenna 5 (refer to FIG. 6(a)) is input to the amplifier circuit 15 and amplified. Then, an amplified signal S12 obtained from the amplifier circuit 15 is input to the switch controller 52.

In the switch controller 52, initially, the rectifier circuit 8 rectifies the amplified signal S12 (refer to FIG. 6(b)), and the level judgment circuit 9 compares the level of the rectified signal S5 with the rising threshold value $V'_{L \to H}$, and sets the level judgment signal S6 into the enable state when the level of the rectified signal S5 becomes equal to or higher than the rising threshold value $V'_{L \to H}$ (refer to FIG. 6(c)).

When the timer circuit 53 receives the level judgment signal S6 in the enable state, it outputs a set signal S7 (refer to FIG. 6(d)) to put the flip-flop 11 into the set state, and the flip-flop 11 in the set state sets the switch control signal S10 into the enable state (refer to FIG. 6(f)), thereby changing the first switch 13 and the second switch 54 from the OFF state to the ON state, and the third switch 55 from the ON state to the OFF state (refer to FIGS. 6(g) to 6(i)). Thereby, supply of the power source S3 from the power supply circuit 6 to the amplifier circuit 15 is stopped, and simultaneously, supply of the power source S4 from the battery 14 to the amplifier circuit 15, the communication circuit 16, the signal processing circuit 21, and the memory 22 is started.

Thereafter, in the switch controller 52, in order to cancel faulty startup of the data carrier 50 due to noise, the timer circuit 53 judges whether or not the enable state of the level judgment signal S6 continues for the monitoring period $T_3$ or more. However, since the reception signal S2 is a noise which appears in a period shorter than the monitoring period $T_3$ as shown in FIG. 6(a), the level of the rectified signal S5 immediately becomes smaller than the falling threshold value $V'_{L \to H}$ within a period shorter than the monitoring period $T_3$, and therefore, the enable state of the level judgment signal S6 returns into the disenable state without continuing for the monitoring period $T_3$ or more. Accordingly, the timer circuit 35 outputs a reset signal S8 after the monitoring period $T_3$ has passed (refer to FIG. 6(e)) to reset the flip-flop 11, thereby setting the switch control signal S10 into the disenable state (refer to FIG. 6(f)). Since the first switch 13 and the second switch 54 are changed from the ON states to the OFF states while the third switch 55 is changed from the OFF state to the ON state (refer to FIGS. 6(g) to 6(i)), supply of the power source S4 from the battery 14 to the amplifier circuit 15, the communication circuit 16, the signal processing circuit 21, and the memory 22 is stopped, and thereby faulty startup of the data carrier 50 due to noise can be cancelled.

As described above, according to the second embodiment, the data carrier 50 is provided with the power supply control unit 51 for controlling the power supply from the power supply circuit 6 or the battery 14 on the basis of the signal level and signal waveform of the amplified signal S12 obtained by amplifying the reception signal S2, and the amplifier circuit 15 in the data carrier 50 and the switch controller 52 in the power supply control unit 51 are operated by the power source S3 obtained from the reception signal S2 while the other circuits are operated by the power source S4 supplied from the battery 14 under the control of the power supply control unit 51. Therefore, in the power supply control unit 51, supply of electric power from the battery 14 to the data carrier 50 can be started even with a signal having a relatively low signal level which is received from the reader/writer 1, and thereby the power supply to the data carrier 50 is stabilized, and thereafter, judgment as to whether the signal level of the amplified signal S12 is equal to or higher than the predetermined reference level or not and judgment for the continuity of this state (if the signal level is equal to or higher than the reference level) are carried out with higher reception sensitivity and reception stability, and the power supply from the battery 14 can be controlled based on the judgment result, thereby enhancing the reliability in the startup operation of the data carrier 50.

Further, according to the second embodiment, in the power supply control unit 51, power supply from the battery 14 is started when it is judged that the signal level of the amplified signal S12 is equal to or higher than the predetermined rising threshold value $V'_{L \to H}$, and thereafter, it is monitored whether the state where the signal level is equal to or higher than the rising threshold value $V'_{L \to H}$ continues for the predetermined monitoring period $T_3$ or not, and the power supply from the battery 14 is stopped only when the signal level of the amplified signal S12 becomes smaller than the predetermined falling threshold value $V'_{L \to H}$ without continuing for the monitoring period $T_3$. Therefore, the supply of electric power from the battery 14 to the data carrier 50 can be automatically started or stopped according to the signal level and signal waveform of the amplified signal S12 while preventing faulty startup of the data carrier 50 due to noise, thereby providing a convenience data carrier which can avoid insignificant dissipation of the battery.

To be specific, according to the second embodiment, it is possible to provide a noncontact data carrier which can realize ensuring of reliability in the startup operation that can avoid faulty startup due to noise as well as prevention of insignificant dissipation of the battery due to faulty startup, that are realized by the noncontact data carrier of the first embodiment, and further, which can be started up with higher reception sensitivity and reception stability as compared with the noncontact data carrier of the first embodiment.

Embodiment 3

Hereinafter, a battery-equipped noncontact data carrier according to a third embodiment of the present invention will be described with reference to FIGS. 7 to 9.

While in the above-mentioned embodiments control for power supply from the battery is performed by judging the signal level of the received signal in the power supply control unit, in this third embodiment it is performed by judging the frequency of the received signal.

Figure 7:
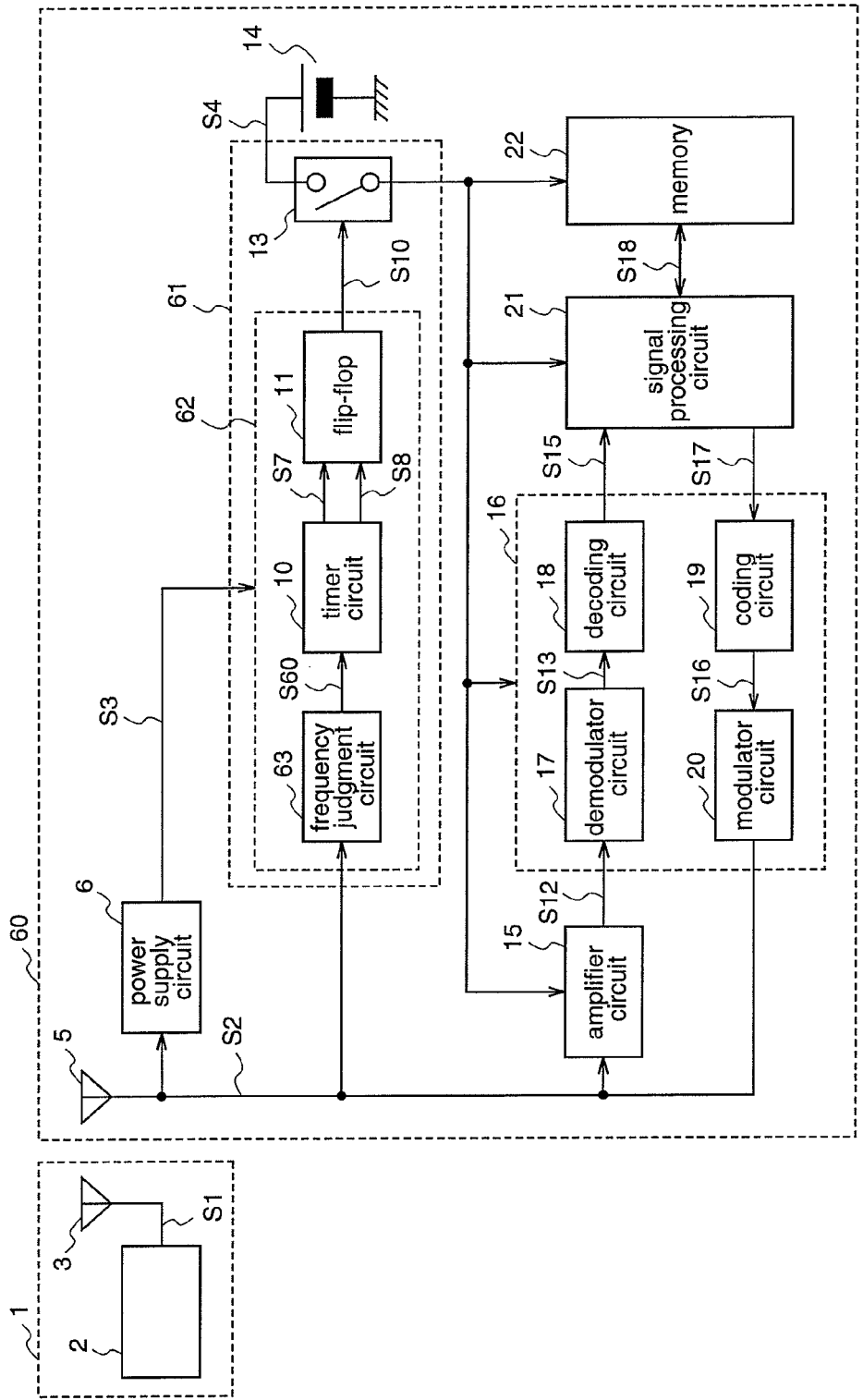
FIG. 7 is a diagram illustrating a circuit construction of a communication system including a data carrier according to a third embodiment and a reader/writer.

FIG. 7 is a diagram illustrating a circuit construction comprising the data carrier of the third embodiment, and a reader/writer.

The data carrier 60 according to the third embodiment is provided with an antenna 5, a power supply circuit 6, an amplifier circuit 15, a communication circuit 16, a signal processing circuit 21, a memory 22, a battery 14, and a power supply control unit 61.

The power supply control unit 61 of this third embodiment controls power supply from the battery 14 to the data carrier 60, and it comprises a switch 13 constituted by a MOS-FET, and a switch controller 62 which performs ON/OFF control for the switch 13 on the basis of the frequency and signal waveform of the reception signal S2.

The switch controller 62 comprises a frequency judgment circuit 63 for judging whether the frequency of the reception signal S2 is included in a predetermined frequency range or not, and outputting a frequency judgment signal S60, a timer circuit 10 for judging whether or not the frequency judgment signal S60 is in the enable state for a predetermined monitoring period or more, and controlling the state of a subsequent flip-flop 11 on the basis of the judgment result, and the flip-flop circuit 11 for outputting a switch control signal S10 which performs ON/OFF control for the switch 13 under the control of the timer circuit 10.

The frequency judgment circuit 63 is constituted by a resonator circuit. A judgment period for judging whether the frequency of the reception signal S2 is included in the frequency range or not by the resonator circuit in the frequency judgment circuit 63 is a value which is extremely shorter than the monitoring period for judging whether the frequency judgment signal S60 is in the enable state or not in the timer circuit 10, and does not cause a problem in practical use. For example, the frequency judgment period is about 2 μsec while the judgment period in the timer circuit 10 is about 70 μsec.

In this third embodiment, the switch 13 controls power supply from the battery 14 to the amplifier circuit 15, the communication circuit 16, the signal processing circuit 21, and the memory 22 on the basis of the switch control signal S10, and the switch control signal S10 turns off the switch 13 when the flip-flop 11 is in the reset state, and turns on the switch 13 when the flip-flop 11 is in the set state. Further, the flip-flop 11 is in the reset state during the initial mode immediately after the power source S3 is turned on, and accordingly, the switch 13 is in the OFF states during the initial mode.

Hereinafter, the operation of the noncontact data carrier according to the third embodiment will be described.

When the data carrier 60 is within the communication area of the reader/writer 1, the data carrier 60 starts reception of a signal S1 transmitted from the reader/writer 1, via the antenna 5. A reception signal S2 received via the antenna 5 is input to the power supply circuit 6, the frequency judgment circuit 63, and the amplifier circuit 15.

When the reception signal S2 is input to the power supply circuit 6, the power supply circuit 6 extracts a power source S3 from the reception signal S2, and supplies the power source S3 to the switch controller 62 in the power supply control unit 61. Thereby, in the power supply control unit 61, the switch controller 62 judges whether the frequency of the reception signal S2 that is transmitted from the reader/writer 1 and received by the data carrier 60 is included in a predetermined frequency range or not, and judges the continuity of this state when the frequency is included in the frequency range, and ON/OFF control for the switch 13 is carried out on the basis of the judgment result.

Hereinafter, the operation of the power supply control unit 61 for controlling the power supply from the battery 14 will be described with reference to FIG. 8. FIG. 8 is a waveform diagram illustrating the signals outputted from the respective circuits in the power supply control unit when the data carrier according to the third embodiment receives a signal from the read/writer, wherein (a) shows the reception signal S2, (b) shows the frequency judgment signal S60, (c) shows the set signal S7, (d) shows the reset signal S8, (e) shows the switch control signal S10, and (f) shows the ON/OFF state of the switch 13. In FIGS. 8(*b*) and 8(*e*), logic "1" shows the enable state and logic "0" shows the disenable state.

Figure 8:
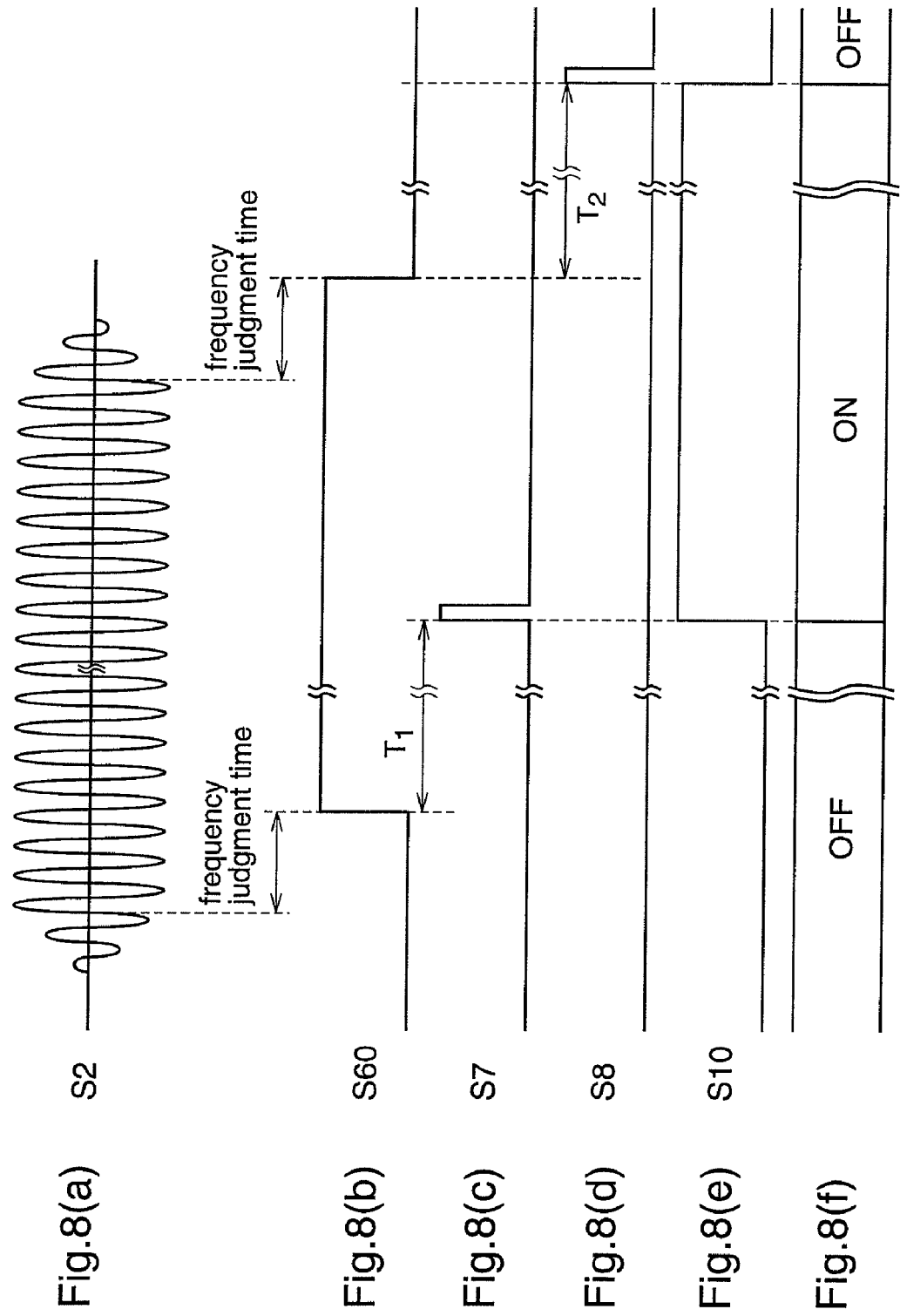
FIG. 8 is a waveform diagram illustrating signals outputted from the respective circuits in a power supply control unit when the data carrier according to the third embodiment receives a signal from the reader/writer.

Initially, the reception signal S2 (refer to FIG. 8(*a*)) received by the antenna 5 is input to the switch control unit 62 that is operated by the power source S3 extracted from the power supply circuit 6.

In the switch controller 62, initially, the frequency judgment circuit 63 judges whether the frequency of the reception signal S2 is included in the predetermined frequency range or not, and sets the frequency judgment signal S60 into the enable state when the frequency of the reception signal S2 is included in the frequency range (refer to FIG. 8(*b*)).

Thereafter, in the switch controller 62, in order to avoid faulty startup of the data carrier 60 due to noise or a reception signal having a different frequency or a reception signal having a nonconstant frequency, the timer circuit 10 judges whether or not the enable state of the frequency judgment signal S60 continues for a predetermined monitoring period $T_1$ or more. The timer circuit 10 outputs a set signal S7 when it is judged that the enable state of the frequency judgment signal S60 has continued for the monitoring period $T_1$ or more, thereby to put the flip-flop 11 in the set state (refer to FIG. 8(*c*)).

When the flip-flop 11 enters the set state, the flip-flop 11 sets the switch control signal S10 into the enable state (refer to FIG. 8(*e*)), thereby changing the first switch 13 from the OFF state to the ON state (refer to FIG. 8(*f*)). Thereby, supply of the power source S4 from the battery 14 to the amplifier circuit 15, the communication circuit 16, the signal processing circuit 21, and the memory 22 is started.

As described above, the power source S4 is supplied to the amplifier circuit 15, the communication circuit 16, the signal processing circuit 21, and the memory 22 in the data carrier 60, whereby the normal operation, i.e., recognition of a command issued by the reader/writer 1 from the reception signal S2, and/or data processing required for the command, and/or generation of a response for the command to the reader/writer 1, is started in the data carrier 60. This normal operation is similar to that described for the first embodiment.

The frequency judgment circuit 63 continuously judges whether the frequency of the reception signal S2 is included in the predetermined frequency range or not, and sets the frequency judgment signal S60 in the disenable state when it is judged that the frequency of the reception signal S2 is not included in the frequency range (refer to FIG. 8(*b*)).

Thereafter, in order to avoid influences by amplitude reduction in the reception signal S2 which is caused by amplitude modulation during the normal communication, the timer circuit 10 judges whether or not the disenable state of the frequency judgment signal S60 continues for a predetermined monitoring period $T_2$ or more, which is sufficiently larger than the maximum value of the amplitude modulation period that appears in the normal communication, and when it is judged that the disenable state of the frequency judgment signal S60 has continued for the monitoring period $T_2$ or more, the timer circuit 10 outputs a reset signal S8 to reset the flip-flop 11 (refer to FIG. 8(*d*)).

When the flip-flop 11 enters the reset state, the flip-flop 11 sets the switch control signal S10 in the disenable state (refer to FIG. 8(*e*)), thereby changing the switch 13 from the ON state to the OFF state (refer to FIG. 8(*f*)). Thereby, supply of the power source S4 from the battery 14 to the amplifier circuit 15, the communication circuit 16, the signal processing circuit 21, and the memory 22 is stopped, and the data carrier 60 again goes into the stand-by state.

Hereinafter, a description will be given of the control operation of the power supply control unit 61 according to the third embodiment in the case where the reception signal S2 is a noise, particularly, when the reception signal S2 is a signal which appears only for a short period and is ineffective as a normal communication signal although it has a frequency included in the frequency. FIG. 9 is a waveform diagram illustrating the signals outputted from the respective circuits in the power supply control unit in the case where the data carrier of the third embodiment receives such short signal, wherein (a) shows the reception signal S2, (b) shows the frequency judgment signal S60, (c) shows the set signal S7, (d) shows the reset signal S8, (e) shows the switch control signal S10, and (f) shows the ON/OFF state of the switch 13. In FIGS. 9(*b*) and 9(*e*), logic "1" shows the enable state and logic "0" shows the disenable state.

Figure 9:
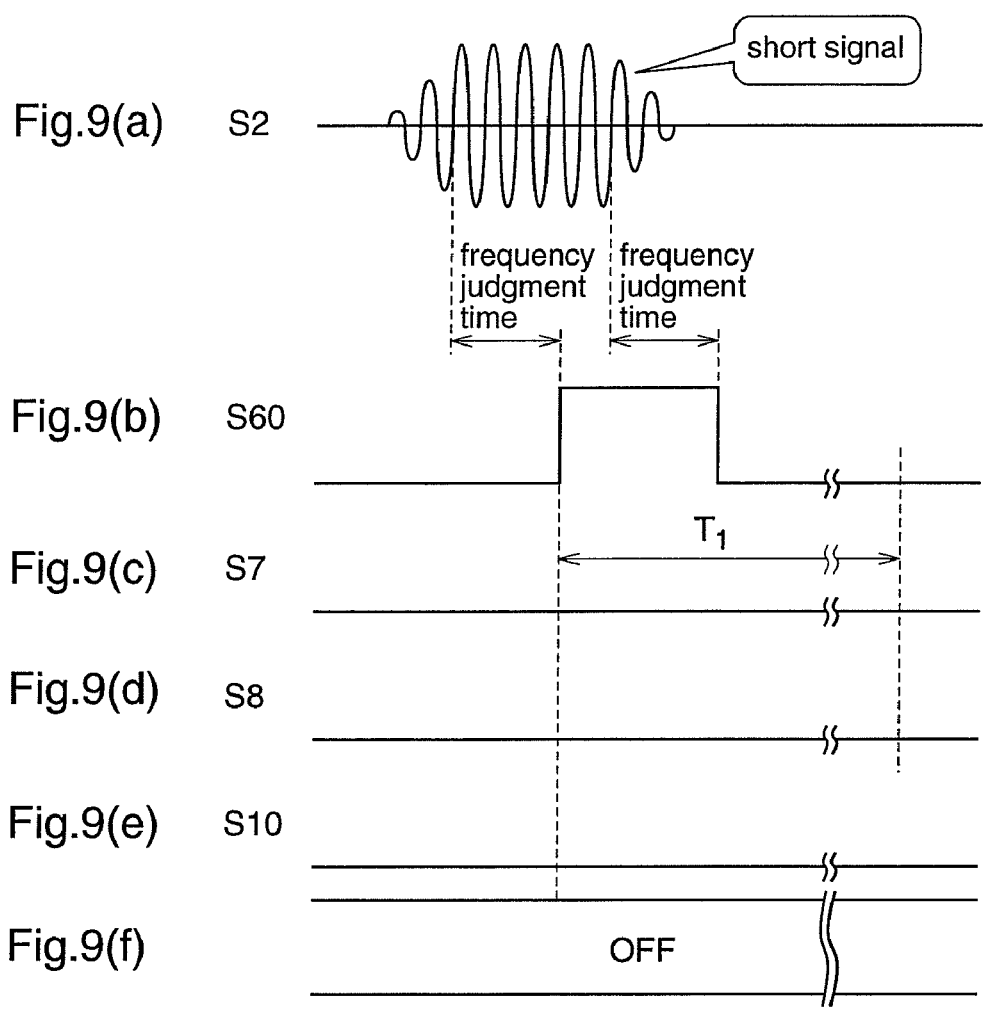
FIG. 9 is a waveform diagram illustrating signals outputted from the respective circuits in the power supply control unit when the data carrier according to the third embodiment receives a short signal.

Initially, the reception signal S2 received by the antenna 5 (refer to FIG. 9(*a*)) is input to the switch controller 62. In the switch controller 62, the frequency judgment circuit 63 judges whether the frequency of the reception signal S2 is included in the predetermined frequency range or not, and sets the frequency judgment signal S60 into the enable state when the frequency of the reception signal S2 is included in the frequency range (refer to FIG. 9(*b*)).

Thereafter, in order to avoid faulty startup of the data carrier 60 due to noise, i.e., the above-mentioned short signal, the timer circuit 10 judges whether or not the enable state of the frequency judgment signal S60 continues for the monitoring period $T_1$ or more. However, when the reception signal S2 is a noise that appears only for a period shorter than the monitoring period $T_1$ as shown in FIG. 9(*a*), the frequency judgment signal S60 immediately goes into the disenable state within a period shorter than the period $T_1$ without going through the monitoring period $T_1$. Accordingly, since the timer circuit 10 outputs no set signal S7 (refer to FIG. 9(*c*)), the flip-flop 11 maintains the reset state, and thereby the switch control signal S10 is kept in the disenable state (refer to FIG. 9(*e*)). As the result, even when a noise, i.e., the above-mentioned short signal, is inputted, since the switch 13 is not turned on but is kept in the OFF state (refer to FIG. 9(*f*)), power supply from the battery 14 to the amplifier circuit 15, the communication circuit 16, the signal processing circuit 21, and the memory 22 is prevented from being started by the noise, i.e., the short signal, thereby avoiding faulty startup of the data carrier 60 due to such noise.

Figure 3:
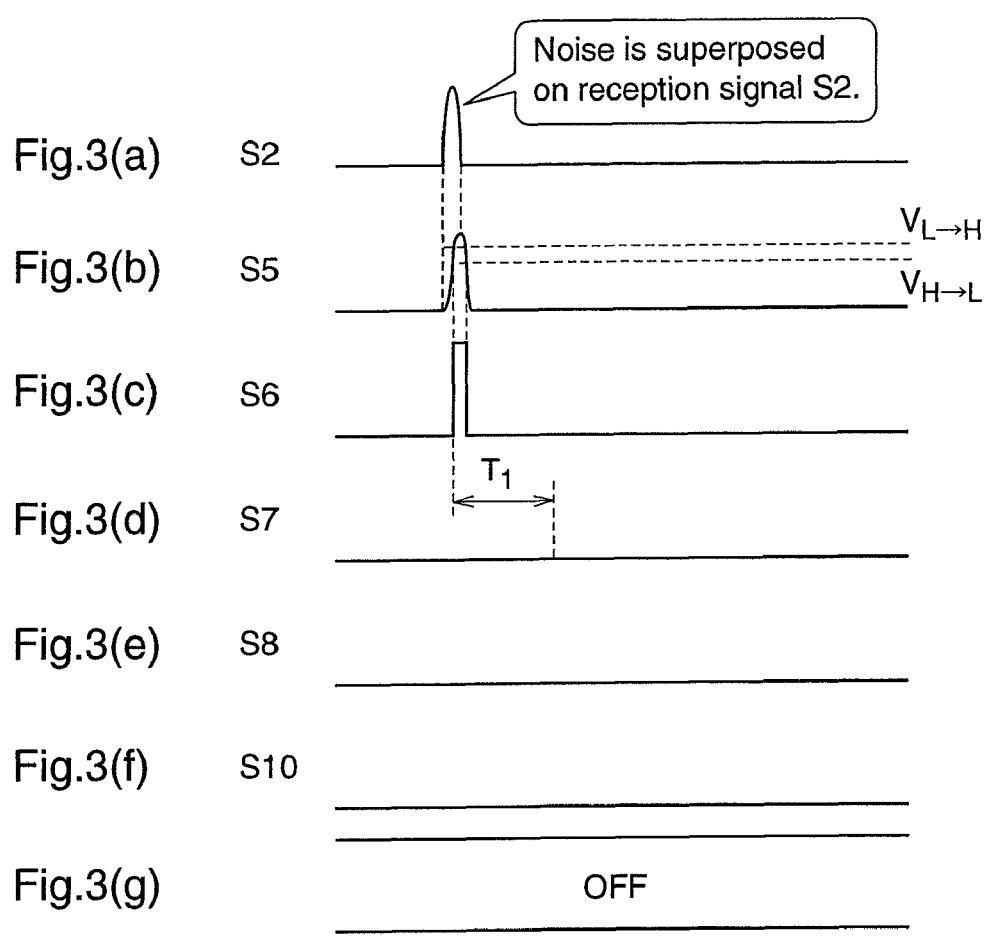
FIG. 3 is a waveform diagram illustrating signals outputted from the respective circuits in the power supply control unit when the data carrier according to the first embodiment receives a signal on which noise is superposed.

Further, when a noise which appears for a period shorter than the frequency judgment period as shown in FIG. 3(*a*) is superposed on the reception signal S2 and input to the data carrier 60 of the third embodiment, since the frequency judgment circuit 63 in the power supply control unit 61 cannot detect the frequency of this noise and therefore the frequency judgment signal S60 is not enabled, supply of the power source S4 from the battery 14 is not started, thereby also avoiding faulty startup of the data carrier 60 due to such noise.

As described above, according to the third embodiment, the data carrier 60 is provided with the power supply control unit 61 for controlling power supply from the battery 14 on the basis of the frequency and signal waveform of the reception signal S2, and the power supply control unit 61 is operated with the power source S3 obtained from the reception signal S2 while the other circuits are operated with the power source S4 supplied from the battery 14 under the control of the power supply control unit 61. Therefore, supply of electric power from the battery 14 to the data carrier 60 can be automatically started or stopped according to the frequency and signal waveform of the reception signal S2 when the data carrier 60 is within the communication area of the reader/writer 1, and the supply of electric power from the battery 14 can be automatically stopped when the data carrier 60 is placed outside the communication area of the reader/writer 1, thereby providing a convenient data carrier 60 which can avoid insignificant dissipation of the battery.

Further, according to the third embodiment, the power supply control unit 61 performs control so as to start power supply from the battery 14 when it is judged that the state where the frequency of the reception signal S2 from the reader/writer 1 is included in the predetermined frequency range has continued for the predetermined monitoring period $T_1$, and further, it performs control so as to stop the power supply from the battery 14 when it is judged that the state where the frequency of the reception signal S2 from the reader/writer 1 is not included in the predetermined frequency range has continued for the predetermined monitoring period $T_2$. Therefore, faulty startup of the data carrier 60 due to noise can be avoided, thereby enhancing the reliability in the startup operation, and avoiding insignificant dissipation of the battery due to faulty startup.

That is, according to the third embodiment, it is possible to provide a noncontact data carrier which can realize ensuring of reliability in the startup operation that can avoid faulty startup due to noise as well as prevention of insignificant dissipation of the battery due to faulty startup, which are realized by the noncontact data carrier of the first embodiment, and further, which can prevent faulty startup due to a continuous signal having a different frequency and a continuous signal having a nonconstant frequency and thereby further enhance the reliability in the startup operation, as compared with the noncontact data carrier according to the first embodiment.

Further, since the signal processing of the reception signal S2 or the communication processing can be performed in the state where stable power supply is performed by the battery 14, communication reliability at practical level can always be secured between the data carrier 60 and the reader/writer 1.

Embodiment 4

Figure 11:
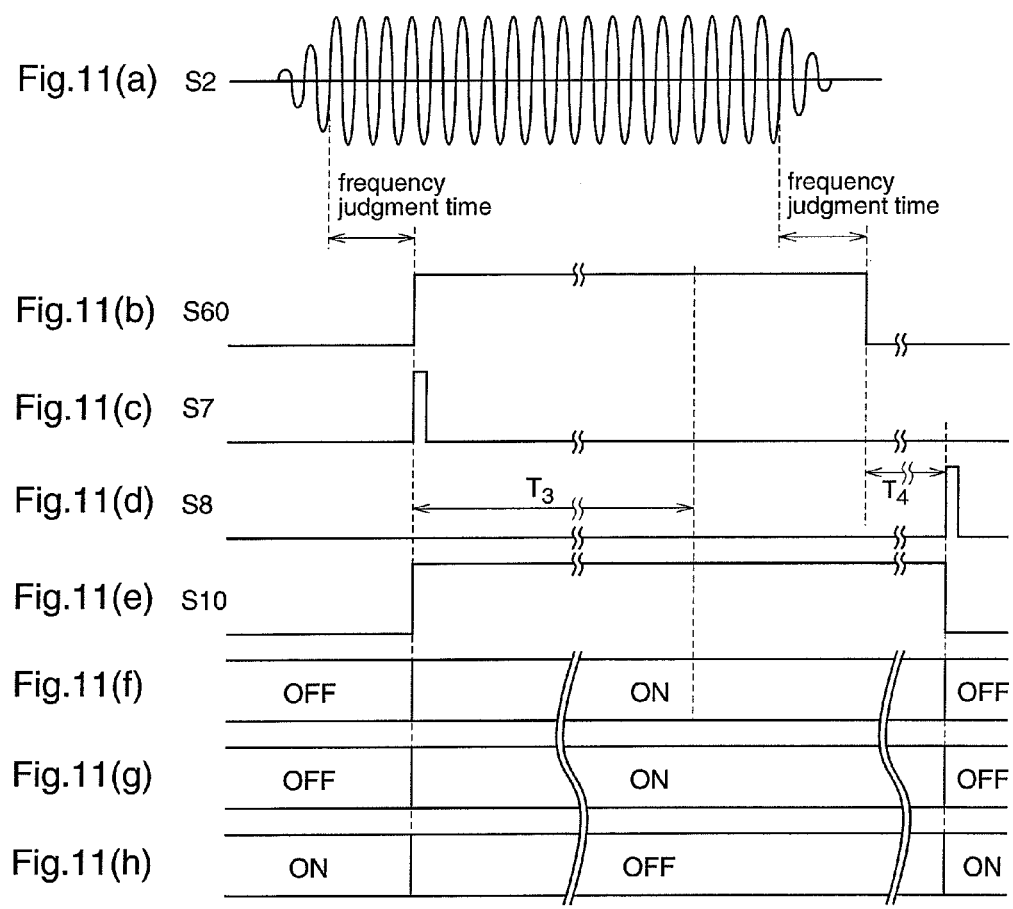
FIG. 11 is a waveform diagram illustrating signals outputted from the respective circuits in a power supply control unit when the data carrier according to the fourth embodiment receives a signal from the reader/writer.
Figure 12:
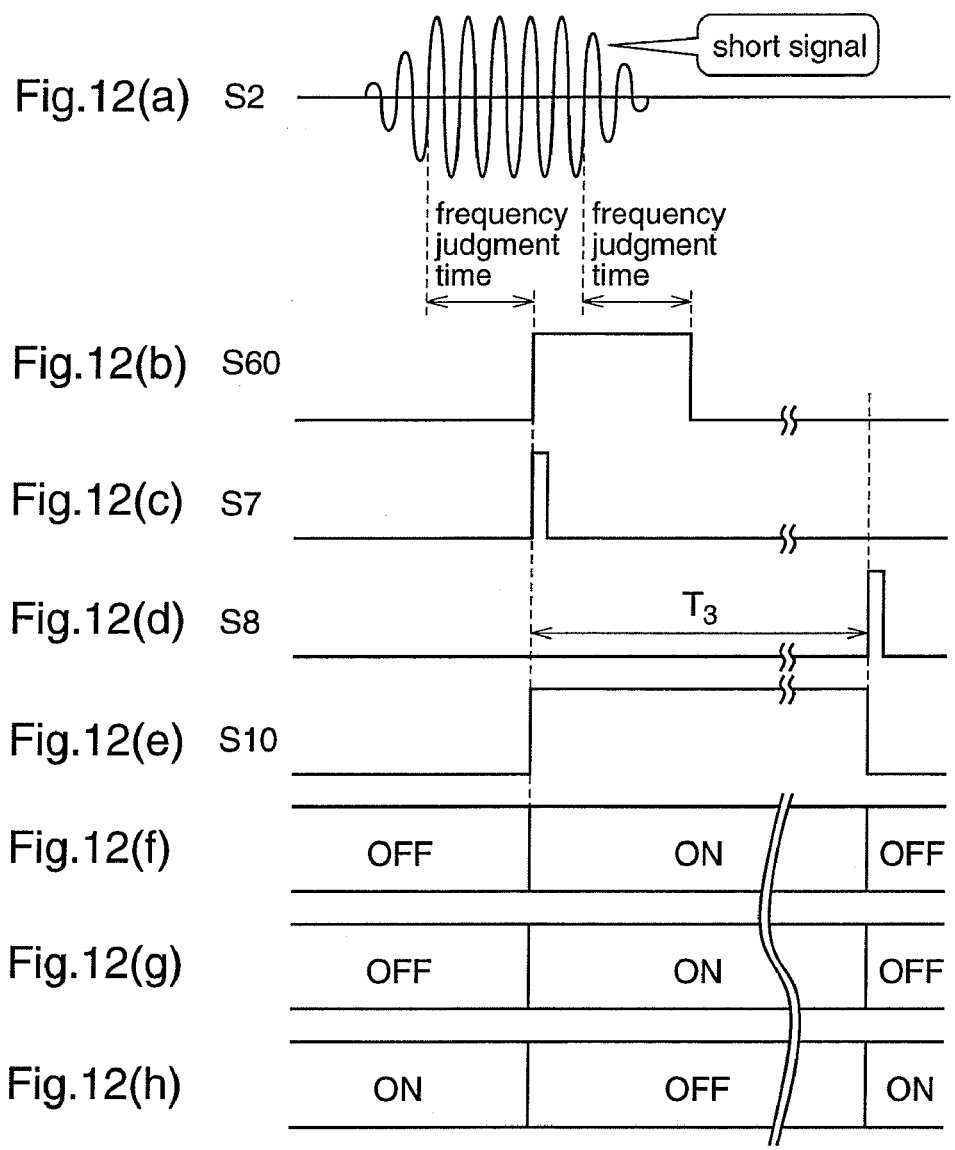
FIG. 12 is a waveform diagram illustrating signals outputted from the respective circuits in the power supply control unit when the data carrier according to the fourth embodiment receives a short signal.

Hereinafter, a battery-equipped noncontact data carrier according to a fourth embodiment of the present invention will be described with reference to FIGS. 10 to 12.

While in the above-mentioned third embodiment the power supply from the battery is started after it is confirmed that the state where the frequency of the reception signal is included in the predetermined frequency range has continued for the predetermined period of time, in this fourth embodiment the power supply from the battery is started when it is recognized that the frequency of the reception signal is included in the predetermined frequency range, and thereafter, the power supply from the battery is stopped only when the state where the frequency of the reception signal is included in the predetermined frequency range has not continued for a predetermined period or more.

Figure 10:
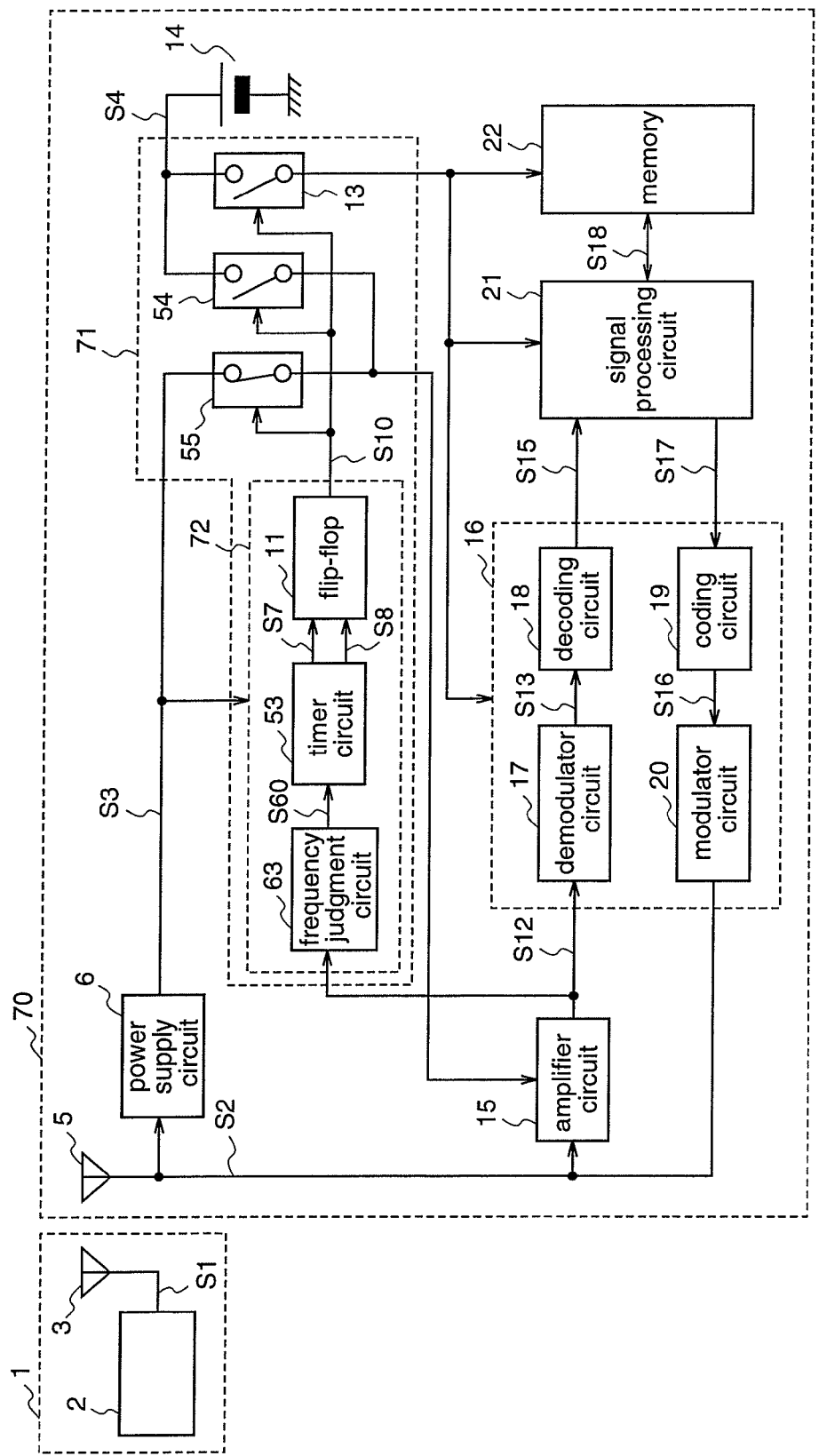
FIG. 10 is a diagram illustrating a circuit construction of a communication system including a data carrier according to a fourth embodiment and a reader/writer.

FIG. 10 is a diagram illustrating a circuit construction of a communication system comprising the data carrier of the fourth embodiment, and a reader/writer.

The data carrier 70 according to the fourth embodiment is provided with an antenna 5, a power supply circuit 6, an amplifier circuit 15, a communication circuit 16, a signal processing circuit 21, a memory 22, a battery 14, and a power supply control unit 71.

The power supply control unit 71 of this fourth embodiment controls supply of a power source S4 from the battery 14 to the data carrier 70 and supply of a power source S3 from the power supply circuit 6 to the data carrier 70, and it comprises first to third switches 13, 54, and 55 constituted by MOSFETs, and a switch controller 72 which performs ON/OFF control for the switches 13, 54, and 55 on the basis of the frequency and signal waveform of an amplified signal S12 obtained in the amplifier circuit 15.

The switch controller 72 comprises a frequency judgment circuit 63 for detecting the frequency of the amplified signal S12 obtained from the amplifier circuit 15, and judging whether the detected frequency is included in a predetermined frequency range or not, and outputting a frequency judgment signal S60 on the basis of the judgment result, a timer circuit 53 for judging whether or not the frequency judgment signal S60 is in the enable state for a predetermined monitoring period or more, and controlling the state of a subsequent flip-flop 11 on the basis of the judgment result, and the flip-flop circuit 11 for outputting a switch control signal S10 that controls ON/OFF of the first to third switches 13, 54, and 55 under the control of the timer circuit 53.

In this fourth embodiment, the first switch 13 controls supply of the power source S4 from the battery 14 to the communication circuit 16, the signal processing circuit 21, and the memory 22 on the basis of the switch control signal S10, and the second switch 54 controls supply of the power source S4 from the battery 14 to the amplifier circuit 15 on the basis of the switch control signal S10, and further, the third switch 55 controls supply of the power source S3 from the power supply circuit 6 to the amplifier circuit 15 on the basis of the switch control signal S10. The switch control signal S10 turns off the first switch 13 and the second switch 54 and turns on the third switch 55 when the flip-flop 11 is in the reset state, and turns on the first switch 13 and the second switch 54 and turns off the third switch 55 when the flip-flop 11 is in the set state. Further, the flip-flop 11 is in the reset state during the initial mode immediately after the power source S3 is turned on, and accordingly, the first switch 13 and the second switch 54 are in the OFF states while the third switch 55 is in the ON state during the initial mode.

Hereinafter, the operation of the noncontact data carrier according to the fourth embodiment will be described.

When the data carrier 70 is within the communication area of the reader/writer 1, the data carrier 70 starts reception of a signal S1 transmitted from the reader/writer 1, via the antenna 5. A reception signal S2 received via the antenna 5 is input to the power supply circuit 6 and the amplifier circuit 15.

When the reception signal S2 is input to the power supply circuit 6, the power supply circuit 6 extracts a power source S3 from the reception signal S2, and supplies the power source S3 to the switch controller 72 in the power supply control unit 71 and to the amplifier circuit 15 via the third switch 55. Thereby, in the amplifier circuit 15, the reception signal S2 that is transmitted from the reader/writer 1 and received by the data carrier 70 is amplified. In the power supply control unit 71, the switch controller 72 judges whether the frequency of the amplified signal S2 from the amplifier circuit 15 is included in the predetermined frequency range or not, and judges the continuity of this state when the frequency is included in the frequency range, and ON/OFF control for the switches 13, 54, and 55 is carried out on the basis of the judgment result.

Hereinafter, the operation of controlling the power supply from the battery 14 in the power supply control unit 71 will be described with reference to FIG. 11. FIG. 11 is a waveform diagram illustrating the signals outputted from the respective circuits in the power supply control unit in the case where the data carrier of the fourth embodiment receives a signal from the read/writer, wherein (a) shows the reception signal S2, (b) shows the rectified signal S5, (c) shows the level judgment signal S6, (d) shows the set signal S7, (e) shows the reset signal S8, (f) shows the switch control signal S10, (g) shows the ON/OFF state of the first switch 13, (h) shows the ON/OFF state of the second switch 54, and (i) shows the ON/OFF state of the third switch 55. In FIGS. 11(c) and 11(f), logic "1" shows the enable state and logic "0" shows the disenable state.

Initially, the reception signal S2 (refer to FIG. 11(a)) received by the antenna 5 is input to the amplifier circuit 15 that is operated by the power source S3 extracted from the power supply circuit 6, and amplified. Then, the amplified signal S12 obtained from the amplifier circuit 15 is input to the switch control unit 52 that is operated by the power source S3. Thereby, even when the signal level of the reception signal S2 received by the antenna 5 is low, it can be detected with a high sensitivity in the power control unit 71.

In the switch controller 72, initially, the frequency judgment circuit 63 judges whether the frequency of the amplified signal S12 is included in the predetermined frequency range or not, and sets the frequency judgment signal S60 in the enable state when the frequency of the reception signal S2 is included in the frequency range (refer to FIG. 11(b)).

When the timer circuit 53 of the fourth embodiment receives the level judgment signal S60 in the enable state, it outputs a set signal S7 to set the flip-flop 11 into the set state (refer to FIG. 11(c)). When the flip-flop 11 enters the set state, the flip-flop 11 sets the switch control signal S10 into the enable state (refer to FIG. 11(e)), thereby changing the first switch 13 and the second switch 54 from the OFF states to the ON states, and the third switch 55 from the ON state to the OFF state (refer to FIGS. 11(f) to 11(h)). Thereby, supply of the power source S3 from the power supply circuit 6 to the amplifier circuit 15 is stopped, and supply of the power source S4 from the battery 14 to the amplifier circuit 15, the communication circuit 16, the signal processing circuit 21, and the memory 22 is started.

As described above, the power source S4 is supplied to the amplifier circuit 15, the communication circuit 16, the signal processing circuit 21, and the memory 22 in the data carrier 70, whereby the normal operation, i.e., recognition of a command issued by the reader/writer 1 from the reception signal S2, and/or data processing required for the command, and/or generation of a response for the command to the reader/writer 1, is started in the data carrier 70. This normal operation is similar to that described for the first embodiment.

In the switch control unit 72 according to the fourth embodiment, in order to cancel faulty startup of the data carrier 70 due to noise, or a reception signal having a different frequency, or a reception signal having a nonconstant frequency after the normal operation is thus started, the timer circuit 53 monitors whether or not the enable state of the frequency judgment signal S60 continues for a predetermined monitoring period $T_3$ or more.

As the result of the monitoring, when the frequency judgment signal S60 goes into the disenable state without maintaining the enable state for the monitoring period $T_3$, the reception signal S2 received by the antenna 5 is judged as not an effective signal transmitted from the reader/writer 1 but a noise, and the timer circuit 53 outputs a reset signal S8 after the monitoring period $T_3$ has passed, thereby to reset the flip-flop 11. The operation of the power supply control unit 71 when the reception signal S2 is judged as a noise will be described later.

The frequency judgment circuit 63 continuously judges whether the frequency of the amplified signal S12 is included in the predetermined frequency range or not, and sets the frequency judgment signal S60 into the disenable state when it is judged that the frequency of the reception signal S2 is not included in the frequency range (refer to FIG. 11(b)).

Thereafter, in the timer circuit 53, in order to avoid influences by amplitude reduction in the reception signal S2 which is caused by amplitude modulation during the normal communication, it is judged whether or not the disenable state of the frequency judgment signal S60 continues for a predetermined monitoring period $T_4$ or more which is sufficiently larger than the maximum value of the amplitude modulation period which appears in the normal communication, and when it is judged that the disenable state of the frequency judgment signal S60 has continued for the monitoring period $T_4$ or more, a reset signal S8 is outputted to reset the flip-flop 11 (refer to FIG. 11(d)).

When the flip-flop 11 enters the reset state, the flip-flop 11 sets the switch control signal S10 in the disenable state (refer to FIG. 11(e)), thereby changing the first switch 13 and the second switch 54 from the ON states to the OFF states, and the third switch 55 from the OFF state to the ON state (refer to FIGS. 11(f) to 11(h)). Thereby, supply of the power source S4 from the battery 14 to the amplifier circuit 15, the communication circuit 16, the signal processing circuit 21, and the memory 22 is stopped, and simultaneously, supply of the power source S3 from the power supply circuit 6 to the amplifier circuit 15 is started, and then the data carrier 70 again goes into the stand-by state.

Hereinafter, a description will be given of the control operation by the power supply control unit 71 according to the fourth embodiment in the case where the reception signal S2 is a noise, particularly, when the reception signal S2 is a signal which appears only for a short period and is ineffective as a normal communication signal although it has a frequency included in the frequency range. FIG. 12 is a waveform diagram illustrating the signals outputted from the respective circuits in the power supply control unit in the case where such short signal is received in the data carrier of the fourth embodiment, wherein (a) shows the reception signal S2, (b) shows the frequency judgment signal S60, (c) shows the set signal S7, (d) shows the reset signal S8, (e) shows the switch control signal S10, (f) shows the ON/OFF state of the first switch 13, (g) shows the ON/OFF state of the second switch 54, and (h) denotes the ON/OFF state of the third switch 55. In FIGS. 12(b) and 12(e), logic "1" shows the enable state and logic "0" shows the disenable state.

Initially, the reception signal S2 received by the antenna 5 (refer to FIG. 12(a)) is input to the amplifier circuit 15 and amplified. Then, an amplified signal S12 obtained from the amplifier circuit 15 is input to the switch controller 72.

In the switch controller 72, initially, the frequency judgment circuit 63 judges whether the frequency of the amplified signal S12 is included in a predetermined frequency range or not, and sets the frequency judgment signal S60 in the enable state when the frequency of the amplified signal S12 is included in the frequency range (refer to FIG. 12(b)).

When the timer circuit 53 receives the frequency judgment signal S60 in the enable state, it outputs a set signal S7 to put the flip-flop 11 into the set state (refer to FIG. 12(c)), and the flip-flop 11 in the set state sets the switch control signal S10 into the enable state (refer to FIG. 12(e)), thereby changing the first switch 13 and the second switch 54 from the OFF states to the ON states, and the third switch 55 from the ON state to the OFF state (refer to FIGS. 12(f) to 12(h)). Thereby, supply of the power source S3 from the power supply circuit 6 to the amplifier circuit 15 is stopped, and simultaneously, supply of the power source S4 from the battery 14 to the amplifier circuit 15, the communication circuit 16, the signal processing circuit 21, and the memory 22 is started.

Thereafter, in the switch controller 72, in order to cancel faulty startup of the data carrier 70 due to noise, i.e., the above-mentioned short signal, the timer circuit 53 judges whether or not the enable state of the frequency judgment signal S60 continues for the monitoring period $T_3$ or more. However, since the noise superposed on the reception signal S2 is a noise which appears only for a short period relative to the monitoring period $T_3$ as shown in FIG. 12(a), the frequency judgment signal S60 immediately returns to the disenable state within a period shorter than the period $T_3$ without passing through the monitoring period $T_3$. Accordingly, the timer circuit 35 outputs a reset signal S8 after the monitoring period $T_3$ has passed (refer to FIG. 12(d)), thereby to reset the flip-flop 11 and set the switch control signal S10 in the disenable state (refer to FIG. 12(e)). Thereby, since the first switch 13 and the second switch 54 are changed from the ON states to the OFF states while the third switch 55 is changed from the OFF state to the ON state (refer to FIGS. 12(f) to 12(h)), supply of the power source S4 from the battery 14 to the amplifier circuit 15, the communication circuit 16, the signal processing circuit 21, and the memory 22 can be stopped, thereby avoiding faulty startup of the data carrier 70 due to noise.

As described above, according to the fourth embodiment, the data carrier 70 is provided with the power supply control unit 71 for controlling the power supply from the power supply circuit 6 and the battery 14 on the basis of the frequency and signal waveform of the amplified signal S12 obtained by amplifying the reception signal S2, and the amplifier circuit 15 in the data carrier 70 and the switch controller 72 in the power supply control unit 71 are operated with the power source S3 obtained from the reception signal S2 while the other circuits are controlled with the power source S4 supplied from the battery 14 under the control of the power supply control unit 71. Therefore, in the power supply control unit 71, supply of electric power from the battery 14 to the data carrier 70 can be started even with a signal having a relatively low signal level which is received from the reader/writer 1, and thereby the power supply to the data carrier 70 is stabilized, and thereafter, judgment as to whether the frequency of the amplified signal S12 is included in the predetermined frequency range or not as well as judgment for the continuity of this state (if the frequency is included in the frequency range) are carried out with higher reception stability and reception sensitivity, and the power supply from the battery 14 can be controlled on the basis of the judgment result, thereby enhancing the reliability in the startup operation of the data carrier 70.

Further, according to the fourth embodiment, in the power supply control unit 71, supply of electric power from the battery 14 is started when it is judged that the frequency of the amplified signal S12 is included in the predetermined frequency range, and thereafter, it is monitored whether the state where the frequency of the reception signal S2 is included in the frequency range continues for the predetermined monitoring period $T_3$ or not, and the power supply from the battery 14 is stopped only when the amplified signal S12 has not continued for the monitoring period $T_3$. Therefore, the power supply from the battery 14 to the data carrier 70 can be automatically started or stopped according to the frequency and signal waveform of the amplified signal S12 while preventing faulty startup of the data carrier 70 due to noise, thereby providing a convenience data carrier which can avoid insignificant dissipation of the battery.

To be specific, according to the fourth embodiment, it is possible to provide a noncontact data carrier which can realize ensuring of reliability in the startup operation that can avoid faulty startup due to noise as well as prevention of insignificant dissipation of the battery due to faulty startup, which are realized by the noncontact data carrier of the first embodiment, and further, which can be started up with higher reception sensitivity and reception stability relative to the noncontact data carrier of the first embodiment, and can prevent faulty startup due to a continuous signal having a different frequency and a continuous signal having a nonconstant frequency and thereby enhance the reliability in the startup operation.

Embodiment 5

Hereinafter, a fifth battery-equipped noncontact data carrier according to a fifth embodiment of the present invention will be described with reference to FIGS. 13 and 14.

While in the above-mentioned embodiments the power supply control unit performs control for automatically starting or stopping power supply from the battery to the data carrier according to the signal state of the reception signal supplied from the reader/writer, i.e., the level, frequency, and signal waveform of the reception signal, in this fifth embodiment the data carrier is provided with a sensor element, and the power supply control unit performs control for automatically starting or stopping power supply from the battery according to a measurement amount obtained by the sensor element, in addition to performing control for automatically starting or stopping power supply from the battery according to the signal state of the reception signal.

Figure 13:
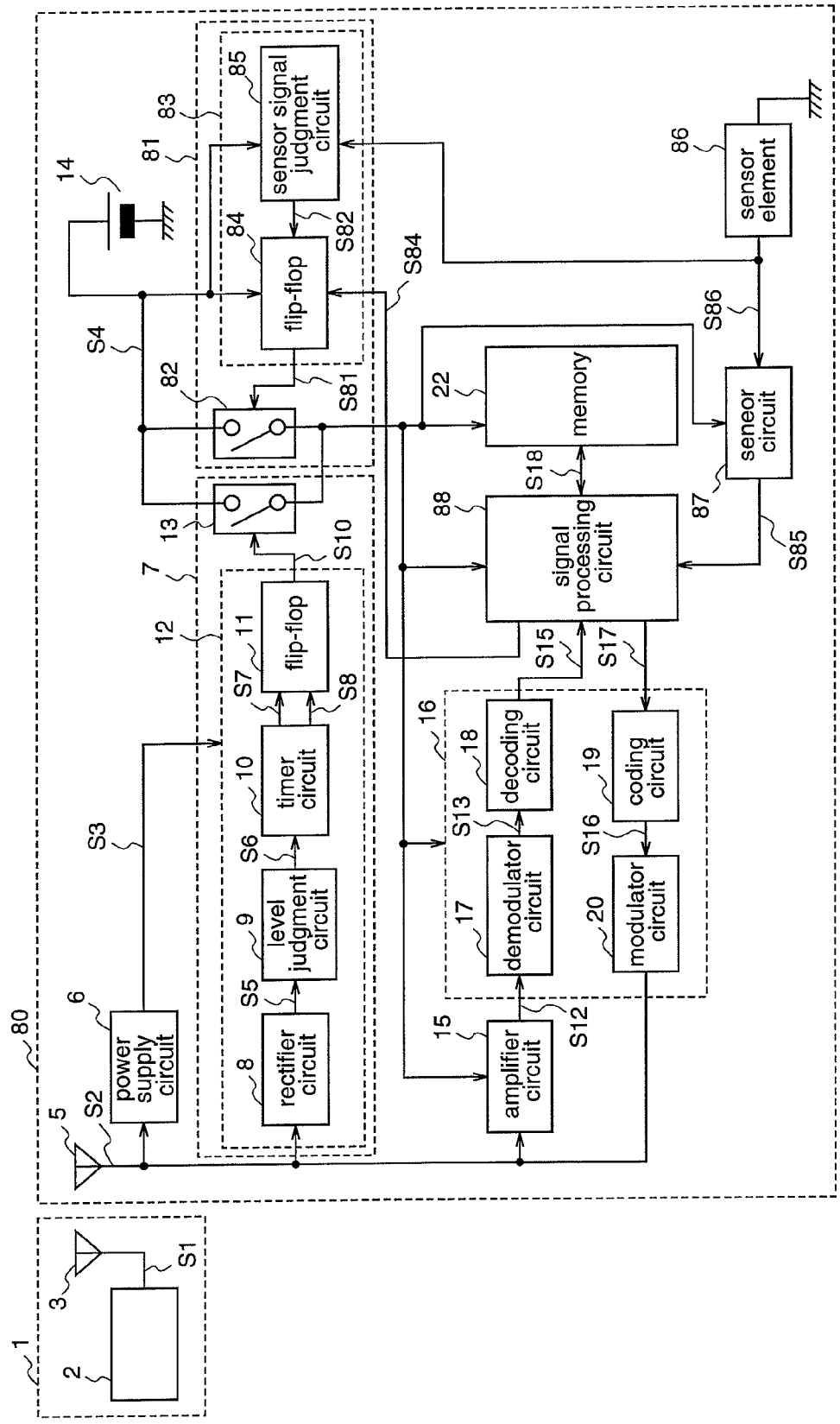
FIG. 13 is a diagram illustrating a circuit construction of a communication system including a data carrier according to a fifth embodiment and a reader/writer.
Figure 14:
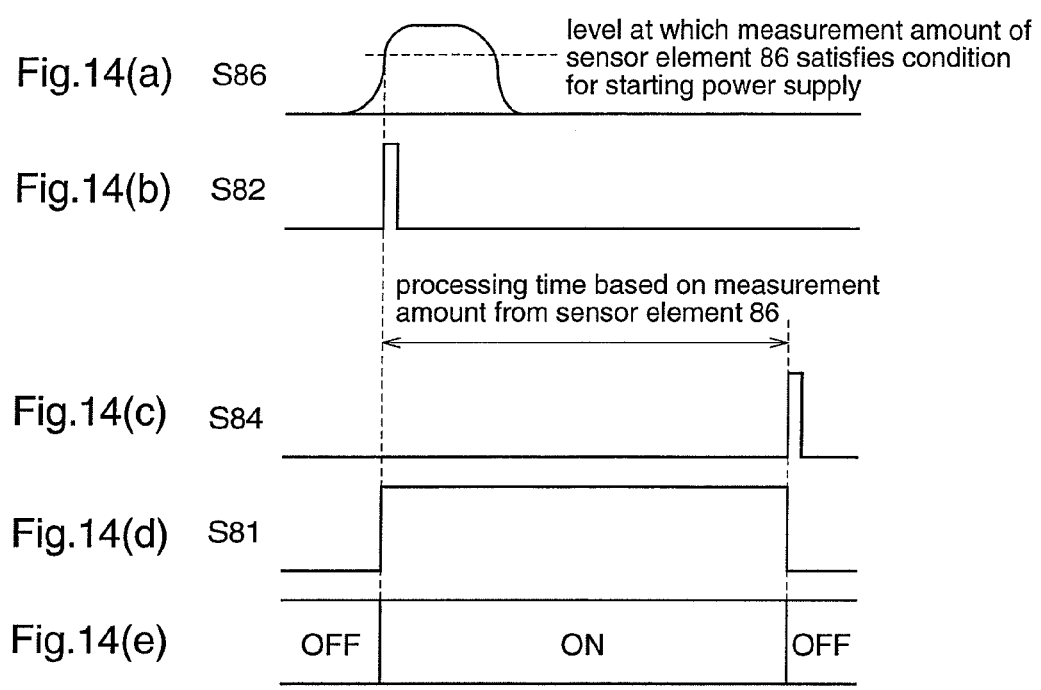
FIG. 14 is a waveform diagram illustrating signals outputted from the respective circuits in a second power supply control unit when a measurement amount at which power supply from the battery should be started is obtained from a sensor element in the data carrier according to the fifth embodiment.

FIG. 13 is a diagram illustrating a circuit construction of a communication system comprising the data carrier of the fifth embodiment and a reader/writer.

The data carrier 80 according to the fifth embodiment is provided with an antenna 5, a power supply circuit 6, an amplifier circuit 15, a communication circuit 16, a memory 22, a battery 14, a sensor element 86, a sensor circuit 87, a signal processing circuit 88, a first power supply control unit 7, and a second power supply control unit 81.

The sensor element 86 is such as a temperature sensor, and outputs a value measured in the sensor element 86 as a sensor signal S86 which is an analog signal. The sensor circuit 87 is constituted mainly by an A/D conversion circuit, and converts the sensor signal S86 outputted from the sensor element 86 into a digitized sensor signal S85 which is a digital signal. The signal processing circuit 88 receives the digitized sensor signal S85 transmitted from the sensor circuit 87 and processes information of the measurement value obtained in the sensor element 86, in addition to recognizing a command from the reader/writer 1, performing data processing required for the command, generating a response to the command, and making an access to the memory 22.

The first power supply control unit 7 comprises a first switch 13, and a first switch controller 12 for controlling ON/OFF of the first switch 13 on the basis of the signal state of the reception signal S2. The construction of the power supply control unit 7 is identical to that of the first embodiment.

The second power supply control unit 81 comprises a second switch 82, and a second switch controller 83 for controlling ON/OFF of the second switch 82 on the basis of the sensor signal S86. The second switch controller 83 comprises a flip-flop 84 which outputs a switch control signal S81 for changing the ON/OFF state of the second switch 82, and a sensor signal judgment circuit 85 which judges whether or not the sensor signal S86 satisfies a condition that is predetermined for judging whether power supply from the battery 14 should be started or not, and outputs a set signal S82 for putting the flip-flop 84 into the set state when the condition is satisfied.

The flip-flop 84 is put into the set state by the set signal S82 outputted from the sensor signal judgment circuit 85, and it is put into the reset state by the reset signal S84 which is outputted from the signal processing circuit 88 when the signal processing circuit 88 completes the processing based on the measurement amount of the sensor element 86.

In this fifth embodiment, the first switch 13 and the second switch 82 control supply of the power source S4 from the battery 14 to the amplifier circuit 15, the communication circuit 16, the signal processing circuit 88, the memory 22, and the sensor circuit 87 on the basis of a control signal S10 and a control signal S81, respectively. The switch control signal S10 turns off the first switch 13 when the flip-flop 11 is in the reset state and turns on the first switch 13 when the flip-flop 11 is in the set state, and the switch control signal S81 turns off the second switch 82 when the flip-flop 84 is in the reset state and turns on the second switch 82 when the flip-flop 84 is in the set state. Further, in the initial state immediately after the power source S3 is turned on, both of the flip-flops 11 and 84 are in the reset states, and both of the first and second switches 13 and 82 are in the OFF states.

Hereinafter, the operation of the noncontact data carrier according to the fifth embodiment will be described.

When the data carrier 80 is within the communication area of the reader/writer 1, the data carrier 80 starts reception of a signal S1 transmitted from the reader/writer 1, via the antenna 5. A reception signal S2 received via the antenna 5 is input to the power supply circuit 6, the rectifier circuit 8, and the amplifier circuit 15.

When the reception signal S2 is input to the power supply circuit 6, the power supply circuit 6 extracts a power source S3 from the reception signal S2, and supplies the power source S3 to the first switch controller 12 in the first power supply control unit 7. Thereby, in the first power supply control unit 7, the switch controller 12 judges the continuity of the reception signal S2 received by the data carrier 80 which is equal to or higher than a predetermined level, and ON/OFF control for the first switch 13 is carried out on the basis of the judgment result. Since the operation of controlling the power supply from the battery 14 by the switch controller 12 and the switch 13 in the first power supply control unit 7 is identical to that described for the first embodiment, detailed description is not necessary.

As described above, when the power source S4 is supplied from the battery 14 to the amplifier circuit 15, the communication circuit 16, the signal processing circuit 88, the memory 22, and the sensor circuit 87 in the data carrier 80 by that the data carrier 80 is placed in the communication area of the reader/writer 1, the data carrier 80 starts the normal operation which includes reading a command issued by the reader/writer 1 from the reception signal S2 and recognizing the same, performing data processing required for the command, and generating a signal for returning a response for the command to the reader/writer 1. Since this normal operation is identical to that described for the first embodiment, detailed description is not necessary.

Further, in this fifth embodiment, when the data carrier 80 exists in the communication area of the reader/writer 1, the reader/writer 1 can issue a command which requests information of the measurement amount obtained by the sensor element 86, to the data carrier 80, in addition to the command issued in the normal operation.

Hereinafter, a description will be given of a series of processing operations to be performed in the data carrier 80 in the case where the reader/writer 1 issues a command which requests information of the measurement amount obtained by the sensor element 86 to the data carrier 80.

As described above, the reader/writer 1 transmits the signal equal to or higher than the predetermined to the data carrier 80 continuously for the predetermined period of time or more to turn on the first switch 13, whereby power supply from the battery 14 to the data carrier 80 can be started.

Under the state where the power supply is started, the reader/writer 1 can transmits a command that requests the information of the measurement amount obtained in the sensor element 86 to the data carrier 80.

When the data carrier 80 receives the command from the reader/writer 1, the sensor signal S86 as an analog signal indicating the measurement amount measured by the sensor element 86 is analog-to-digital converted by the sensor circuit 87, thereby obtaining a digitized sensor signal S85. Thereafter, the signal processing circuit 88 receives the digitized sensor signal S85 and obtains information relating to the measurement amount of the sensor element 86. The signal processing circuit 88 generates a response including the obtained information of the measurement amount of the sensor element 86, and returns it to the reader/writer 1. Thereby, the reader/writer 1 can obtain the information of the measurement amount of the sensor element 86 from the data carrier 80 existing in the communication area of the reader/writer 1.

By the way, in this fifth embodiment, when the data carrier 80 exists in the communication area of the reader/writer 1, the power supply control unit 7 automatically starts supply of the power source S4 from the battery 14 according to the signal level and signal waveform of the reception signal S2 received from the reader/writer 1. However, even when the data carrier 80 does not exist in the communication area of the reader/writer 1 and cannot receive the signal from the reader writer 1, the data carrier 80 can automatically start supply of the power source S4 from the battery by the power supply control unit 81 according to the measurement amount obtained in the sensor element 86 included in the data carrier 80.

The switch 82 is identical to the switch 13, and does not require a power source like the switch 13. Further, the flip-flop 84 is identical to the flip-flop 11.

Hereinafter, the control operation for the power supply from the battery 14 by the second power supply control unit 81 will be described in detail with reference to FIG. 14. FIG. 14 is a waveform diagram illustrating the signals outputted from the respective circuits in the second power supply control unit when the measurement amount with which power supply from the battery is to be started can be obtained from the sensor element in the data carrier of the fifth embodiment, wherein (a) shows the sensor signal S86, (b) shows the set signal S82, (c) shows the reset signal S84, (d) shows the second switch control signal S81, and (e) shows the ON/OFF state of the second switch 82. In FIG. 13(*d*), logic "1" shows the enable state and logic "0" shows the disenable state.

The information of the measurement amount obtained in the sensor element 86 is obtained as the sensor signal S86 which is an analog signal (refer to FIG. 14(a)). The sensor signal S86 is input to the sensor signal judgment circuit 85 and to the sensor circuit 87.

On receipt of the sensor signal S86, the sensor signal judgment circuit 85 judges whether the measurement value of the sensor element 86 satisfies the predetermined condition for starting power supply from the battery 14 or not. When the measurement value satisfies the condition, the sensor signal judgment circuit 85 outputs the set signal S82 (refer to FIG. 14(b)) to puts the flip-flop 84 into the set state.

When the flip-flop 84 enters the set state, the first switch control signal S81 enters the enable state (refer to FIG. 14(b)), and the second switch 82 is changed from the OFF state to the ON state (refer to FIG. 14(e)). Thereby, supply of the power source S4 from the battery 14 to the amplifier circuit 15, the communication circuit 16, the signal processing circuit 88, the memory 22, and the sensor circuit 87 is started.

When the power source S4 is supplied to the amplifier circuit 15, the communication circuit 16, the signal processing circuit 21, the memory 22, and the sensor circuit 87 in the data carrier 80 as described above, the signal processing circuit 88 becomes capable of performing the processing based on the measurement amount measured in the sensor element 86.

When the signal processing circuit 88 completes the processing based on the measurement amount, it outputs a reset signal S84 to the flip-flop 84 to reset the flip-flop 84 (refer to FIG. 14(c)).

When the flip-flop 84 enters the reset state, the second switch control signal S81 enters the disenable state (refer to FIG. 14(d), and the second switch 82 is changed from the ON state to the OFF state (refer to FIG. 14(e)). Thereby, supply of the power source S4 from the battery 14 to the amplifier circuit 15, the communication circuit 16, the signal processing circuit 88, the memory 22, and the sensor circuit 87 is stopped, and the data carrier 80 returns to the state where it waits for the measurement amount of the sensor element 86 to again satisfy the condition for stating power supply from the battery 14.

As described above, since the above-described series of power supply control operations performed by the second power supply control unit 81 do not require the power supply by the power source S3 that is extracted from the reception signal S2 from the reader/writer 1 by the power supply circuit 6, these operations are executed even when the data carrier 80 does not exist in the communication area of the reader/writer 1.

That is, it is possible to realize a data carrier 80 which starts supply of the power source S4 from the battery 14 according to the measurement amount of the sensor element and executes the necessary processings for the measurement amount of the sensor element 86 even when the data carrier 80 does not exist in the communication area of the reader/writer 1.

The power source S4 from the battery 14 is continuously supplied to the flip-flop 84 and the sensor signal judgment circuit 85. However, the power supply current during the non-operation time which is supplied to the flip-flop 84 and the sensor signal judgment circuit 85 is a minute current about 0.01 µA that is equivalent to the natural consumption of the battery 14, and it is a consumption current value causing no problem in the practical use of the data carrier 80.

In this fifth embodiment, since supply of the power source S4 from the battery 14 is controlled according to the measurement value measured by the sensor element 86 as described above, if a command is issued from the reader/writer 1 during the power supply control processing, a collision occurs between these two series of processings.

As a countermeasure against to such collision, in the data carrier 80 according to the fifth embodiment, when the two series of processings occur, the processing that occurs later is not started until the processing that occurs first is completed.

In the data carrier 80, the second power supply control unit 81 performs power supply from the battery 14 via the second switch 82 on the basis of the measurement amount obtained in the sensor element 86. While the processing based on the measurement amount of the sensor element 86 is being carried out, the signal processing circuit 88 sets a flag signal indicating that the processing based on the measurement amount of the sensor element 86 is being carried. If the data carrier 80 receives a command from the reader/writer 1 during this period, the data carrier 80 recognizes only that the command is received from the reader/writer 1 in the signal processing circuit 88, and returns a response informing that it has been in the busy state to the reader/writer 1, after the processing based on the measurement amount of the sensor element 86 is completed.

Conversely, while the data carrier 80 receives a command from the reader/writer 1 and the processing based on the command is being performed in the signal processing circuit 88, the data carrier 80 sets a flag signal indicating that it is in the busy state for the command processing in the signal processing circuit 88 so as not to start the processing for the measurement amount of the sensor element 86.

Thereby, in the data carrier 80, even when a collision of the processings occurs, the respective processings can be executed under the circuit operation condition equivalent to the case where no collision occurs, and particularly, in the data carrier 80, the processing based on the measurement amount of the sensor element 86 can be performed with the same noise level and the same load condition to the battery 14 as those for the case where the collision of the two processings has not occurred. Therefore, it is possible to solve the problem of a measurement amount deviation which is caused by the difference in the operation environment, i.e., caused by that the command from the reader/writer 1 is received or that the processing based on this command is carried out, can be solved, and further, it is possible to constitute one processing program without considering an influence of the other processing for the processing based on the measurement amount of the sensor element 86 and the processing for the command from the reader/writer 1.

As described above, according to the fifth embodiment, the data carrier 80 is provided with the first power supply control unit 7 for controlling supply of the power source 54 from the battery 14 on the basis of the signal level and signal waveform of the reception signal S2 transmitted from the reader/writer 1, and the second power supply control unit 81 for controlling supply of the power source S4 from the battery 14 according to the measurement amount obtained in the sensor element 86. Therefore, it is possible to realize a convenient data carrier 80 which can perform control for automatically starting or stopping the supply of the power source S4 from the battery 14 to the data carrier 80 by the power supply control unit 7 according to the signal level and signal waveform of the reception signal S2 when the data carrier 80 is in the communication area of the reader/writer 1, and automatically stopping the supply of the power source S4 from the battery 14 when the data carrier 80 is placed outside the communication area of the reader/writer 1, and furthermore, which can start the supply of the power source 4 from the battery 14 by the power supply control unit 81 on the basis of the measurement amount obtained by the sensor element 86 even when the data carrier 80 is outside the communication area of the reader/writer 1, thereby to perform the series of processings based on the measurement amount of the sensor element 86. Furthermore, since the signal processing for the reception signal S2 or the communication processing can be performed under the state where stable power supply is carried out by the battery 14, communication reliability at the practical level can always be always secured between the data carrier 4 and the reader/writer 1.

Further, according to the fifth embodiment, the power supply control unit 7 performs control so as to start the power supply from the battery 14 when the state where the signal level of the reception signal S2 from the reader/writer 1 is equal to or higher than the predetermined level has continued for the predetermined monitoring period or more, and stop the power supply from the battery 14 when the state where signal level of the reception signal S2 is lower than the predetermined level has continued for the predetermined monitoring period or more, and further, the power supply control unit 81 performs control so as to start the power supply from the battery 14 when the measurement amount obtained in the sensor element 86 satisfies the predetermined condition for starting the power supply, and stop the power supply from the battery 14 when the necessary processing based on the measurement amount of the sensor element 86 is completed. Therefore, in the data carrier 80, both of the processing for the command transmitted from the reader/writer 1 and the processing based on the measurement amount of the sensor element 86 can be performed with the power supply from the battery 14 being automatically started or stopped, while avoiding faulty startup due to noise, thereby avoiding insignificant dissipation of the battery.

In this fifth embodiment, supply of the power source S4 from the battery 14 is started after the continuity of the reception signal level equal to or higher than the predetermined value for the predetermined period or more is confirmed in the power supply control unit 7. However, the continuity of the reception signal equal to or higher than the predetermined value for the predetermined period or more may be confirmed after the supply of the power source S4 from the battery 14 is started when the reception signal level equal to or higher than the predetermined value is recognized, and the power supply from the battery may be ended only when the reception signal level has not continued. Alternatively, not the signal level of the reception signal S2 from the reader/writer 1 but the frequency of the reception signal S2 may be judged.

Embodiment 6

Hereinafter, a sixth battery-equipped noncontact data carrier according to a sixth embodiment of the present invention will be described with reference to FIGS. 15 and 17.

In this sixth embodiment, the data carrier is provided with a charging function for the battery.

Figure 15:
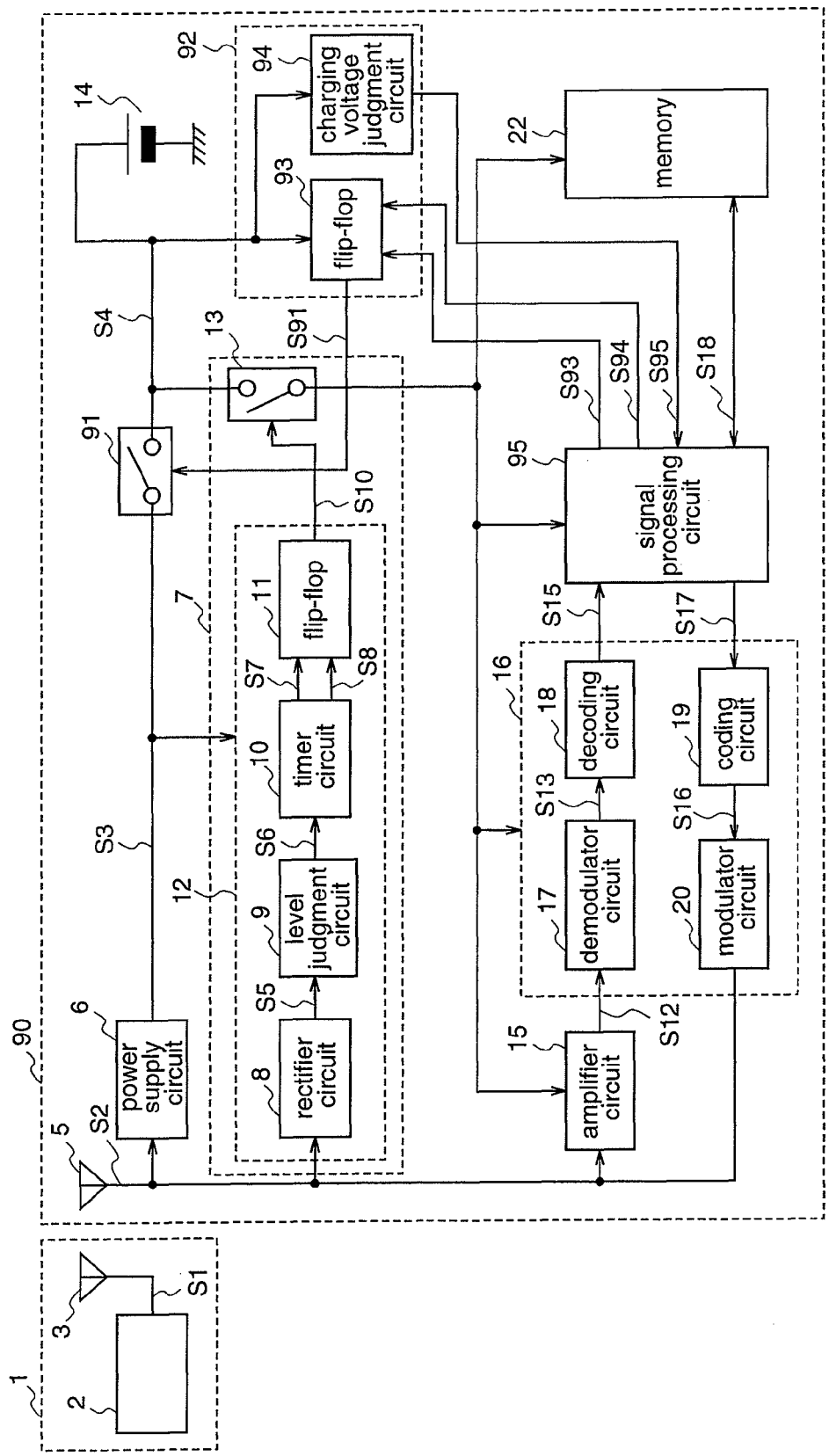
FIG. 15 is a diagram illustrating a circuit construction of a communication system including a data carrier having a battery charging function according to a sixth embodiment and a reader/writer.

FIG. 15 is a diagram illustrating a circuit construction of a communication system comprising the data carrier of the sixth embodiment which includes the battery charging function, and a reader/writer.

The sixth data carrier 90 according to the sixth embodiment is provided with an antenna 5, a power supply circuit 6, a first power supply control unit 7, an amplifier circuit 15, a communication circuit 16, a signal processing circuit 95, a memory 22, a second switch 91, a second switch controller 92, and a battery 14 as a secondary cell.

The power supply control unit 7 is provided with a first switch 13, and a first switch control unit 12 for performing ON/OFF control for the switch 13 on the basis of the signal level and signal waveform of the reception signal S2, and the construction thereof is identical to that of the first embodiment.

The second switch 91 performs charging control for the battery 14 by the power source S3 extracted from the reception signal S2 by the power supply circuit 6. The second switch controller 92 performs ON/OFF control for the second switch 91 on the basis of the terminal voltage of the battery 14, and it is provided with a charging voltage judgment circuit 94 form measuring the terminal voltage of the battery 14, and judging as to whether charging of the battery 14 is necessary or not on the basis of the measurement result, and a second flip-flop 93 for outputting a second switch control signal S91 which changes the ON/OFF state of the second switch 91. The signal processing circuit 95 which has received a charging voltage judgment signal S95 outputted from the charging voltage judgment circuit 94 outputs a second set signal S93 or a second reset signal S94 for controlling the second flip-flop 93. The second flip-flop 93 is set or reset by the second set signal S93 and the second reset signal S94, respectively.

The signal processing circuit 95 further performs a control for charging to the battery 14 as a secondary cell, in addition to a processing for a command received from the reader/writer 1, a data processing required for the command, generation of a response to the reader/writer 1, and access to the memory 22.

In this sixth embodiment, the first switch 13 controls supply of the power source S4 from the battery 14 to the amplifier circuit 15, the communication circuit 16, the signal processing circuit 95, and the memory 22 in the data carrier 90 on the basis of the first switch control signal S10. The first switch control signal S10 turns off the first switch 13 when the first flip-flop 11 is in the reset state, and turns on the first switch 13 when the first flip-flop 11 is in the set state. On the other hand, the second switch control signal S91 turns off the second switch 91 when the second flip-flop 93 is in the reset state, and turns on the second switch 91 when the second flip-flop 93 is in the set state. Further, in the initial state immediately after the power source S3 is turned on, both of the first and second flip-flops 11 and 94 are in the reset states, and thereby both of the first and second switches 13 and 91 are in the OFF states.

The second switch 91 is identical to the first switch 13, and does not require a power supply. Further, the second flip-flop 93 is identical to the first flip-flop 11.

Hereinafter, the operation of the noncontact data carrier according to the sixth embodiment will be described.

When the data carrier 90 is within the communication area of the reader/writer 1, the data carrier 90 receives a signal S1 transmitted from the reader/writer 1 by the antenna 5. A reception signal S2 received by the antenna 5 is input to the power supply circuit 6, the rectifier circuit 8, and the amplifier circuit 15.

When the reception signal S2 is input to the power supply circuit 6, the power supply circuit 6 extracts a power source S3 from the reception signal S2, and supplies the power source S3 to the first switch controller 12 in the first power supply control unit 7. Thereby, in the first power supply control unit 7, the first switch controller 12 judges the continuity of a predetermined signal level of the reception signal S2 that is transmitted from the reader/writer 1 and received by the data carrier 90, and performs ON/OFF control for the first switch 13 on the basis of the judgment result. Since the operation for controlling the power supply from the battery 14 by the first switch controller 12 and the first switch 13 in the first power supply control unit 7 is identical to that described for the first embodiment, detailed description is not necessary.

As described above, when the power source S4 is supplied to the amplifier circuit 15, the communication circuit 16, the signal processing circuit 95, and the memory 22 in the data carrier 90, the data carrier 90 starts a normal operation which includes reading a command transmitted from the reader/writer 1 from the reception signal S2 and recognizing the command, performing a necessary data processing for the command, and generating a signal for returning a response to the command to the reader/writer 1. Since this normal operation is identical to that described for the first embodiment, detailed description is not necessary.

In the data carrier 90 according to the sixth embodiment, when the data carrier 90 exists in the communication area of the reader/writer 1, a continuous signal is transmitted from the reader/writer 1 to the data carrier 90 by utilizing an idle time in the communication of the reader/writer 1, thereby to charge the battery 14.

Figure 16:
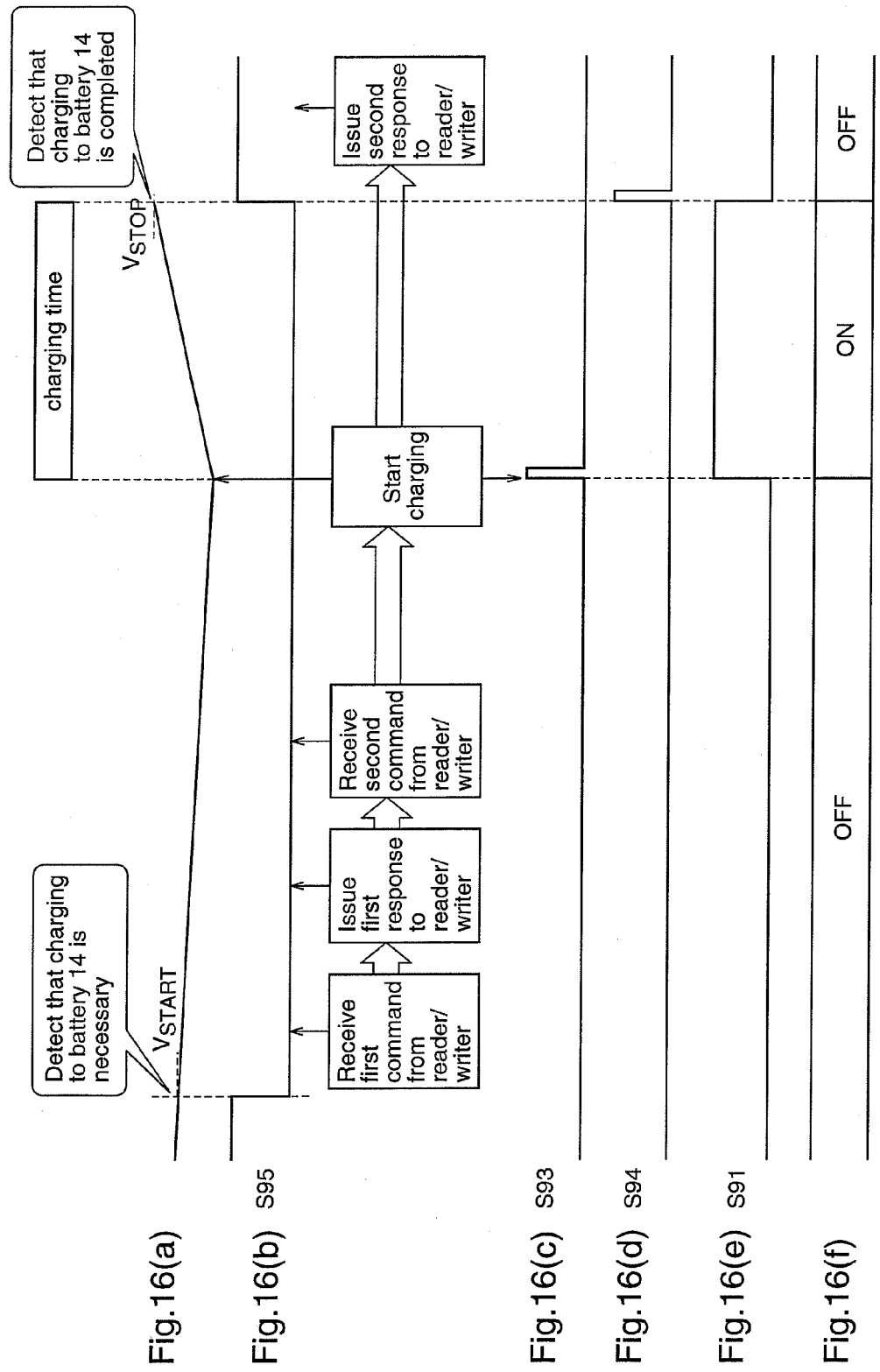
FIG. 16 is a waveform diagram illustrating the flow of a charging process of the data carrier for charging the battery in the data carrier according to the sixth embodiment, and signals outputted from the circuits relating to the charging process.

Hereinafter, the operation of charging the battery 14 will be described with reference to FIGS. 16 and 17. FIG. 16 is a waveform diagram illustrating the flow of the charging process by the data carrier for charging the battery of the data carrier, and the signals outputted from the circuits relating to the charging process, wherein (a) shows the terminal voltage of the battery 14, (b) shows the charging voltage judgment signal S95, (c) shows the set signal S93, (d) shows the reset signal S94, (e) shows the second switch control signal S91, and (f) shows the ON/OFF state of the second switch 91. In FIGS. 16(b) and 16(e), logic "1" shows the enable state and logic "0" shows the disenable state. FIG. 17 is a flowchart of process steps performed by the reader/writer and the data carrier for charging the battery of the data carrier according to the sixth embodiment.

Figure 17:
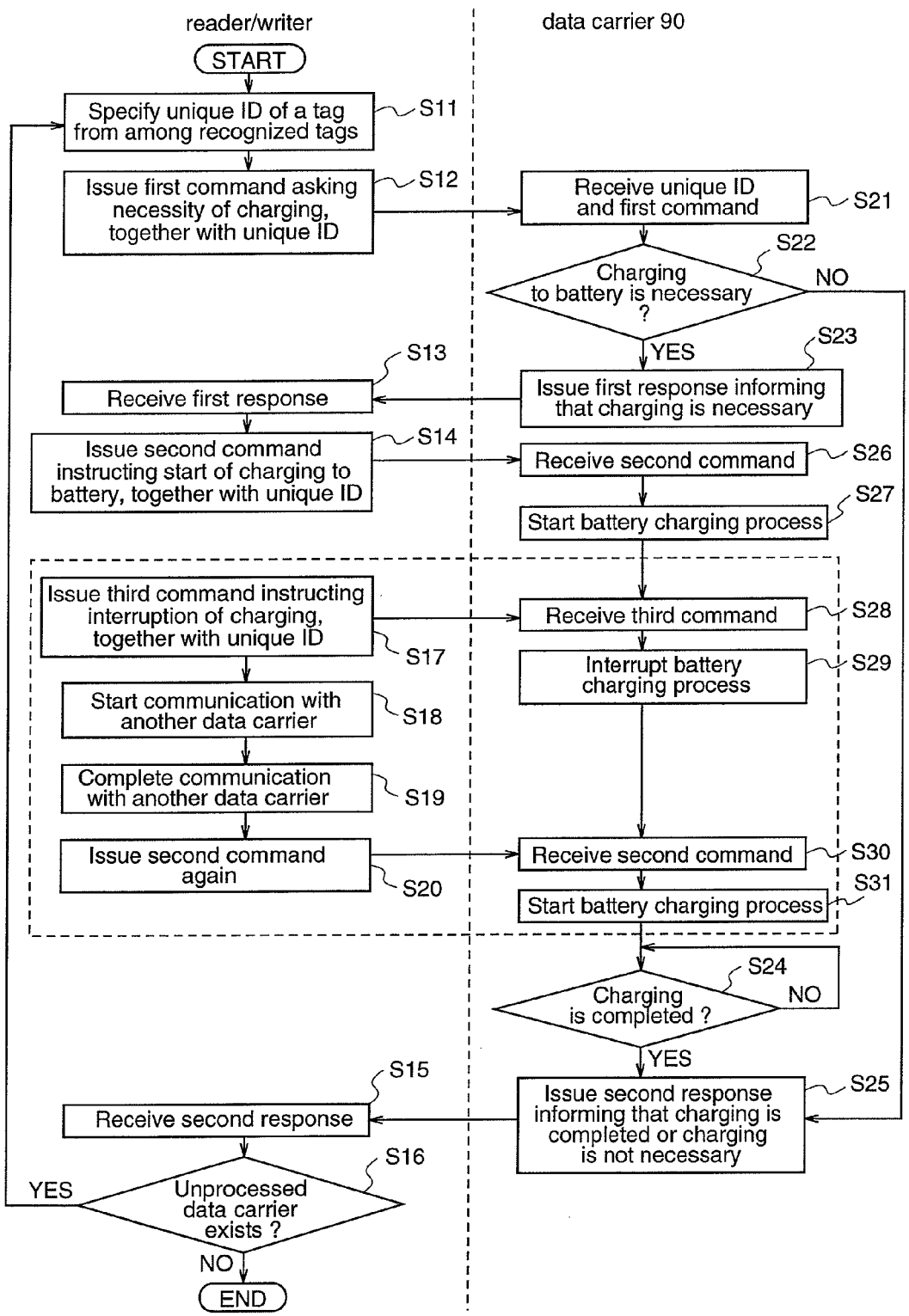
FIG. 17 is a flowchart for explaining the process steps to be performed by the reader writer and the data carrier, for charging the battery of the data carrier according to the sixth embodiment.
Figure 18:
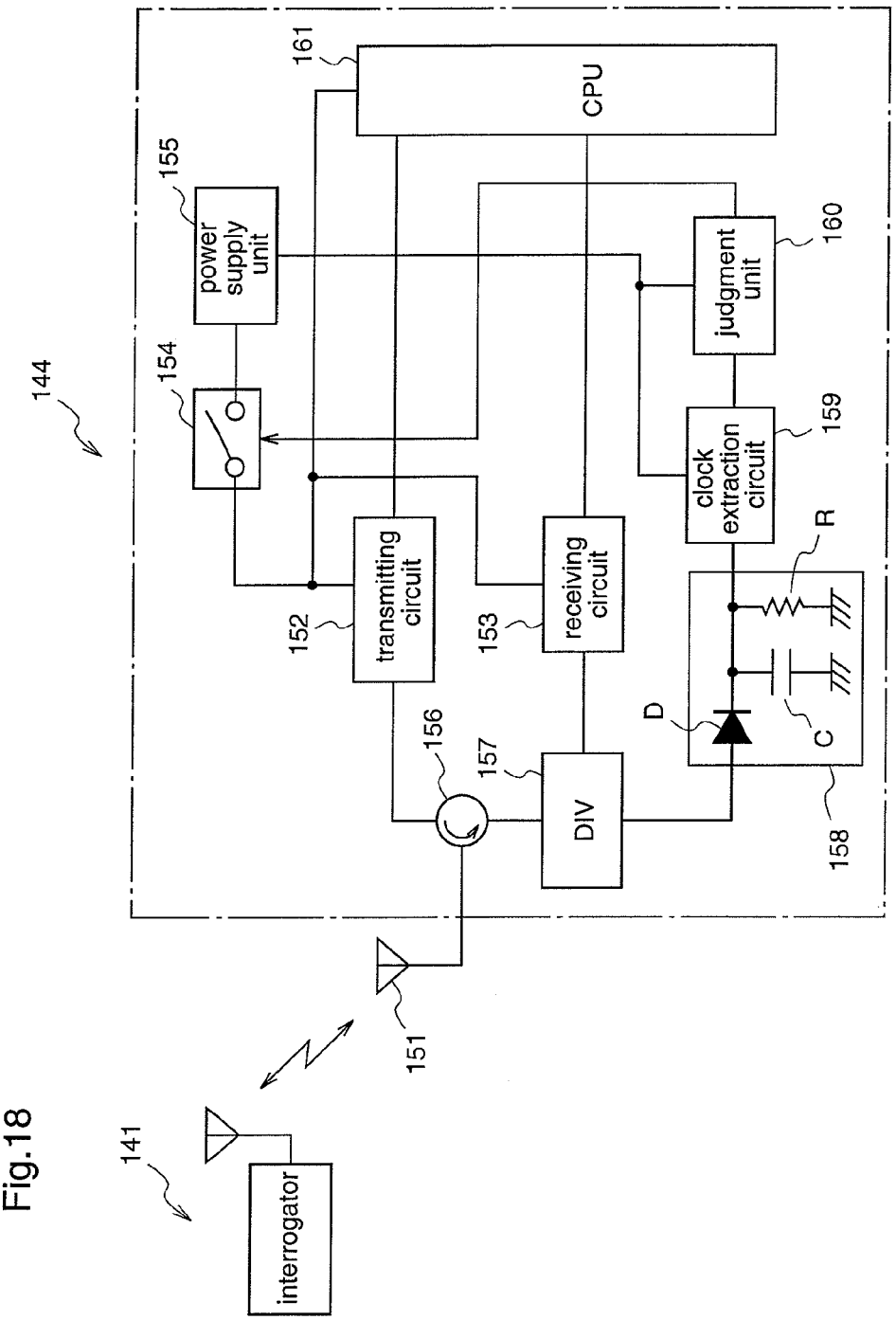
FIG. 18 is a diagram schematically illustrating a communication system comprising a conventional battery-equipped noncontact data carrier, and a reader/writer performing communication with the noncontact data carrier using a microwave.

The command issued from the reader/writer 1, the circuit operation of the data carrier 90, and the response of the data carrier 90 which are used in the above-mentioned algorithm and shown in FIGS. 16 and 17 are also applicable to the case where plural data carriers exist in the communication area of the reader/writer 1, and they are performed under the state where the reader/writer 1 completes the operation of recognizing all the data carriers existing in the communication area of the reader/writer 1 to recognize unique identifications (hereinafter referred to as "unique IDs") of the data carriers. In the one or plural data carriers, the charging voltage judgment circuit 94 continuously measures the terminal voltage of the battery 14, and sets the charging voltage judgment signal S95 into the disenable state when the terminal voltage becomes a predetermined voltage $V_{START}$ which requires charging.

Initially, the reader/writer 1 selects one data carrier from among the one or plural data carriers existing in the communication area, whose unique IDs are recognized, and issues a first command asking the necessity of charging to the battery 14 to the selected data carrier while designating the unique ID of the data carrier with a parameter (steps S11,S12).

Although the first command is received by all the data carriers existing in the communication area of the reader/writer 1, the first command is executed only in the data carrier whose unique ID matches the unique ID designated by the reader/writer among the one or plural data carriers.

In the data carrier having the matched unique ID, the signal processing circuit 95 recognizes that the unique ID matches (step S21). Thereby, the signal processing circuit 95 generates a first response including the contents indicating that charging is not necessary and the unique ID as parameters when the charging voltage judgment signal S95 supplied from the charging voltage judgment circuit 94 is in the enable state, while generates a first response including the contents indicating that charging is necessary and the unique ID as parameters when the charging voltage judgment signal S95 is in the disenable state, and returns the response to the reader/writer 1 (steps S22,S23).

When the reader/writer 1 receives, from the data carrier 90, the first response including the unique ID and the contents indicating that charging is necessary as parameters (step S13), the reader/writer 1 issues a second command which instructs the data carrier 90 to change the second switch 91 to the ON state while specifying the unique ID of the data carrier 90 with a parameter (step S14).

In step S22, when the reader writer 1 receives, from the data carrier 90, the response including the unique ID and the contents indicating that charging is not necessary as parameters, the reader/writer 1 terminates the charging to the data carrier 90, and issues a second response indicating that effect (step S25).

When the data carrier 90 having the matched unique ID receives the second command (step S26), the signal processing circuit 95 recognizes the second command, and starts battery charging (step S27). That is, the signal processing circuit 95 in the data carrier 90 outputs a second set signal S93 (refer to FIG. 16(c)) to put the second flip-flop 93 into the set state.

When the second flip-flop 93 enters the set state, the second flip-flop 93 sets the second switch control signal S91 into the enable state (refer to FIG. 16(e)), and changes the second switch 91 from the OFF state to the ON state (refer to FIG. 16(f)). Thereby, charging to the battery 14 is started.

Even during the charging period, the charging voltage judgment circuit 94 measures the terminal voltage of the battery 14 (refer to FIG. 16(a)). When the terminal voltage of the battery 14 is increased due to the charging by the power supply S3 and the charging voltage judgment circuit 94 detects that the terminal voltage reaches a predetermined voltage $V_{STOP}$ at which the charging should be stopped, the charging voltage judgment signal S95 is set into the enable state (refer to FIG. 16(b)).

The signal processing circuit 95 which has received the charging voltage judgment signal S95 in the enable state from the charging voltage judgment circuit 94 outputs a second reset signal S94 to the second flip-flop 93 (refer to FIG. 16(d)), and the second flip-flop 93 which has received the second reset signal S94 goes into the reset state, and sets the second switch control signal S91 into the disenable state (refer to FIG. 16(e)), thereby changing the second switch 91 from the ON state to the OFF state (refer to FIG. 16(f)). Thereby, the charging to the battery 14 is terminated (step S24). The power source S4 from the battery 14 is continuously supplied to the second flip-flop 93 and the charging voltage judgment circuit 94. However, the power supply current during the non-operating time which is supplied to the second flip-flop 93 and the charging voltage judgment circuit 94 is a minute current of about 0.01 μA which is equivalent to the natural consumption of the battery 14, and it is a consumption current value causing no problem in the practical use of the data carrier 90.

Thereafter, the data carrier 90 transmits, to the reader/writer 1, a second response indicating that charging of the battery 14 is completed, while specifying the unique ID of the data carrier 90 as a parameter (step S25).

When the reader/writer 1 receives the second response indicating that charging is completed or changing is not necessary, the reader/writer 1 recognizes the unique ID specified in the second response, and recognizes the data carrier having the unique ID as the data carrier which has completed the charging.

Further, the reader/writer 1 judges whether a data carrier having a unique ID different from the already-processed unique ID and requiring the series of charging processes exists in the communication area or not, by issuing the first command (step S16). When the reader/writer 1 judges that there is a data carrier requiring the charging process, the reader/writer 1 again starts the charging process for the data carrier. When the reader/writer 1 judges that there is no data carrier which requires the charging process, the reader/writer 1 terminates the series of charging processes.

By the way, when there is a necessity of communication with another data carrier existing in the communication area of the reader/writer 1 while the reader/writer 1 performs the above-mentioned charging process to one data carrier existing in the communication area, the reader/writer 1 can interrupt the charging to the battery of the data carrier which performs the charging process, and start communication with the other data carrier.

In this case, the reader/writer 1 issues a third command instructing interruption of the charging process to the data carrier 90 while specifying the unique ID (step S17), and thereafter, starts communication with the other data carrier (step S18).

When the data carrier 90 performing the charging process receives the third command (step S28), the signal processing circuit 95 recognizes that the unique ID of the data carrier matches the unique ID specified in the third command 3, and then performs a battery charging interruption process after (step S29).

That is, the signal processing circuit 95 outputs a second reset signal S94 to the second flip-flop 93. On receipt of the second reset signal S94, the second flip-flop 93 goes into the reset state, and sets the second switch control signal S91 into the disenable state to turn off the second switch 91, whereby the charging to the battery 14 is stopped, and simultaneously, a third response indicating that the charging is stopped is transmitted to the reader/writer 1, with the unique ID of the data carrier being specified as a parameter. On receipt of the third response, the reader/writer 1 recognizes the unique ID specified in the third response, and recognizes that the data carrier having the unique ID is the data carrier for which charging is not yet completed.

At the timing when the reader/writer 1 completes the communication with the other data carrier (step S19), the reader/writer 1 issues, according to need, a second command instructing start of charging to the data carrier for which charging is not yet completed, together with the unique ID of the data carrier (step S20), and the data carrier 90 that has received the second command starts the battery charging process (steps S30, S31).

As described above, according to the sixth embodiment, since the data carrier 90 is provided with the charging function for charging the battery 14 with the power supply S3 which is extracted by the power supply circuit 6 from the reception signal S2 received from the reader/writer 1, the data carrier 90 can be repeatedly used by charging the battery.

In addition, according to the sixth embodiment, the reader/writer 1 can continue charging to the battery of the data carrier performing the charging process, while one-by-one selecting a data carrier to be charged from among one or plural data carriers existing in the communication area, and while ensuring a necessary communication with a data carrier other than the data carrier performing the charging process, which communication may occur periodically or suddenly during the charging process.

Applicability in Industry

The noncontact data carrier of the present invention can ensure reliability in startup operation and reliability in communication operation which cause no problem in practical use in communication with the reader/writer, and can avoid insignificant dissipation of the battery. Further, the noncontact data carrier provided with the sensor element can execute a processing for the sensor information by the data carrier alone independently from the reader/writer.

The invention claimed is:

1. A noncontact data carrier which performs radio communication with a reader/writer, using electromagnetic wave or electromagnetically-induced binding via an antenna, comprising:
   a power supply unit for obtaining a power source from a reception signal received by the antenna;
   a demodulation unit for demodulating the reception signal;
   a decoding unit for decoding the demodulated signal;
   a signal processing unit for performing data processing based on the contents of the decoded signal, and generation of a signal to be transmitted to the reader/writer;
   a coding unit for coding the signal to be transmitted to the reader/writer, which signal is generated in the signal processing unit;
   a modulation unit for changing the signal coded by the coding unit to a modulated signal;
   a battery for performing supply of electric power to a part of the noncontact data carrier or to the whole circuit; and
   a power supply control unit for controlling start or stop of the supply of electric power from the battery to a part of the noncontact data carrier or to the whole circuit, on the basis of the signal state of the reception signal,
   wherein
   said power supply control unit comprises:
      a frequency judgment unit for performing a first judgment as to whether the frequency of the reception signal is included in a predetermined frequency range or not, and
      a time judgment unit for performing a second judgment as to whether the state where the frequency of the reception signal is included in the predetermined frequency range is continued for a predetermined period of time or not, after the first judgment is made by the frequency judgment unit, and
   said power supply control unit starts supply of electric power from the battery to the noncontact data carrier when the second judgment is made by the time judgment unit after the first judgment has been made by the frequency judgment unit.

2. A noncontact data carrier as defined in claim 1 wherein
   said time judgment unit further performs a third judgment for judging whether the state where the frequency of the reception signal is not included in the frequency range is continued for a predetermined period of time or not, in addition to the second judgment, and
   said power supply control unit starts supply of electric power from the battery to the noncontact data carrier when the second judgment is made by the time judgment unit after the first judgment has been made by the frequency judgment unit, and stops the supply of electric power when the third judgment is made by the time judgment unit.

3. A noncontact data carrier which performs radio communication with a reader/writer, using electromagnetic wave or electromagnetically-induced binding via an antenna, comprising:
   a power supply unit for obtaining a power source from a reception signal received by the antenna;
   a demodulation unit for demodulating the reception signal;
   a decoding unit for decoding the demodulated signal;

a signal processing unit for performing data processing based on the contents of the decoded signal, and generation of a signal to be transmitted to the reader/writer;

a coding unit for coding the signal to be transmitted to the reader/writer, which signal is generated in the signal processing unit;

a modulation unit for changing the signal coded by the coding unit to a modulated signal;

a battery for performing supply of electric power to a part of the noncontact data carrier or to the whole circuit; and a power supply control unit for controlling start or stop of the supply of electric power from the battery to a part of the noncontact data carrier or to the whole circuit, on the basis of the signal state of the reception signal, wherein said power supply control unit comprises:

a frequency judgment unit for performing a first judgment as to whether the frequency of the reception signal is included in a predetermined frequency range or not, and a time judgment unit for performing a second judgment as to whether the state where the frequency of the reception signal is included in the predetermined frequency range is continued for a predetermined period of time or not, after the first judgment is made by the frequency judgment unit, and said power supply control unit starts supply of electric power from the battery to the noncontact data carrier when the first judgment is made by the frequency judgment unit, continues the supply of electric power when the second judgment is made by the time judgment unit, and stops the supply of electric power when the second judgment is not made.

4. A noncontact data carrier as defined in claim 3 wherein said time judgment unit further performs a third judgment for judging whether the state where the frequency of the reception signal is not included in the frequency range is continued for a predetermined period of time or not, in addition to the second judgment, and said power supply control unit starts supply of electric power from the battery to the noncontact data carrier when the first judgment is made by the frequency judgment unit, and stops the supply of electric power when the third judgment is made by the time judgment unit in the state where the second judgment has been made by the time judgment unit.

5. A noncontact data carrier which performs radio communication with a reader/writer, using electromagnetic wave or electromagnetically-induced binding via an antenna, comprising:

a power supply unit for obtaining a power source from a reception signal received by the antenna;

a demodulation unit for demodulating the reception signal;

a decoding unit for decoding the demodulated signal;

a signal processing unit for performing data processing based on the contents of the decoded signal, and generation of a signal to be transmitted to the reader/writer;

a coding unit for coding the signal to be transmitted to the reader/writer, which signal is generated in the signal processing unit;

a modulation unit for changing the signal coded by the coding unit to a modulated signal;

a battery for performing supply of electric power to a part of the noncontact data carrier or to the whole circuit; and a first power supply control unit for controlling start or stop of the supply of electric power from the battery to a part of the noncontact data carrier or to the whole circuit, on the basis of the signal state of the reception signal;

a sensor element; and a second power supply control unit for controlling start or stop of supply of electric power from the battery to the noncontact data carrier on the basis of a measurement amount that is measured by the sensor element; and said signal processing unit performing data processing based on the contents of the decoded signal, and/or data processing based on the measurement amount obtained by the sensor element, and/or generation of a signal to be transmitted to the reader/writer, and/or recording into the memory.

6. A noncontact data carrier as defined in claim 5 wherein said second power supply control unit automatically starts supply of electric power from the battery to the noncontact data carrier on the basis of the measurement amount obtained by the sensor element, and stops the supply of electric power when a processing that is predetermined based on the measurement amount, which has been started by the signal processing unit, is stopped.

* * * * *